(12) United States Patent
Tabuchi

(10) Patent No.: US 12,532,076 B2
(45) Date of Patent: Jan. 20, 2026

(54) METHODS AND APPARATUS FOR OPTICAL IMAGE STABILIZATION

(71) Applicant: SEMICONDUCTOR COMPONENTS INDUSTRIES, LLC, Scottsdale, AZ (US)

(72) Inventor: Yoshihisa Tabuchi, Gifu (JP)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 0 days.

(21) Appl. No.: 18/636,498

(22) Filed: Apr. 16, 2024

(65) Prior Publication Data

US 2024/0267626 A1   Aug. 8, 2024

Related U.S. Application Data

(63) Continuation of application No. 17/249,742, filed on Mar. 11, 2021, now Pat. No. 11,991,447.

(51) Int. Cl.
*H04N 23/68* (2023.01)
*G02B 27/64* (2006.01)
*G03B 5/00* (2021.01)
*G03B 5/02* (2021.01)

(52) U.S. Cl.
CPC ......... *H04N 23/687* (2023.01); *G02B 27/646* (2013.01); *G03B 5/00* (2013.01); *G03B 5/02* (2013.01); *G03B 2205/0015* (2013.01); *G03B 2217/005* (2013.01)

(58) Field of Classification Search
CPC ............... H04N 23/687; G02B 27/646; G03B 2205/0015; G03B 5/00; G03B 5/02
See application file for complete search history.

(56) References Cited

U.S. PATENT DOCUMENTS

| | | | |
|---|---|---|---|
| 5,794,078 A * | 8/1998 | Okazaki | G03B 5/00 396/53 |
| 2011/0063458 A1 | 3/2011 | Washisu et al. | |
| 2012/0215477 A1 * | 8/2012 | Tuck | G01P 21/00 73/1.38 |
| 2014/0320678 A1 | 10/2014 | Lee et al. | |
| 2015/0033821 A1 | 2/2015 | Mangano | |
| 2018/0184005 A1 | 6/2018 | Morotomi et al. | |
| 2020/0192115 A1 | 6/2020 | Abe | |

FOREIGN PATENT DOCUMENTS

JP        2007311974 A      11/2007

* cited by examiner

*Primary Examiner* — Minh Q Phan
(74) *Attorney, Agent, or Firm* — Dickinson Wright PLLC

(57) ABSTRACT

Various embodiments of the present technology may provide methods and apparatus for optical image stabilization. The methods and apparatus for optical image stabilization may be integrated within an electronic device. An exemplary system may include an actuator control circuit responsive to a sensor and a feedback signal from an actuator. The actuator control circuit may be configured to calibrate a gain applied to a drive signal based on a measured displacement of the electronic device and an output signal generated by the actuator control circuit.

16 Claims, 9 Drawing Sheets

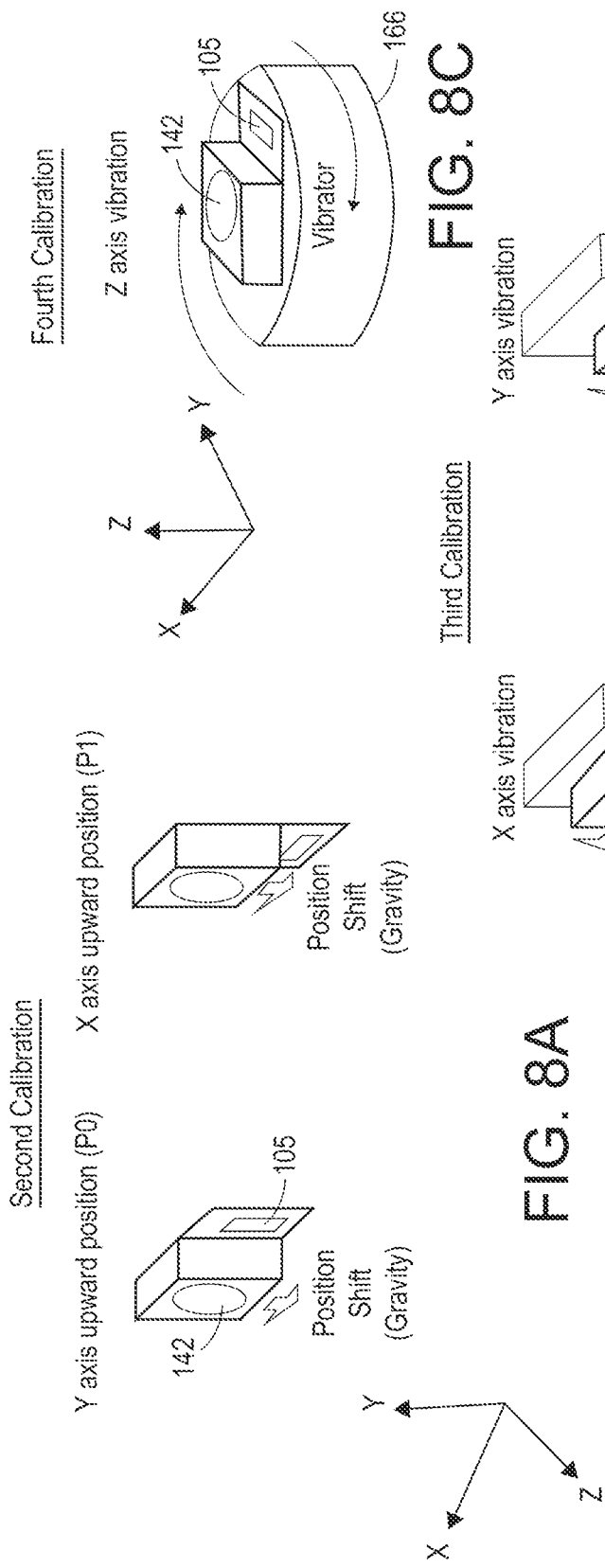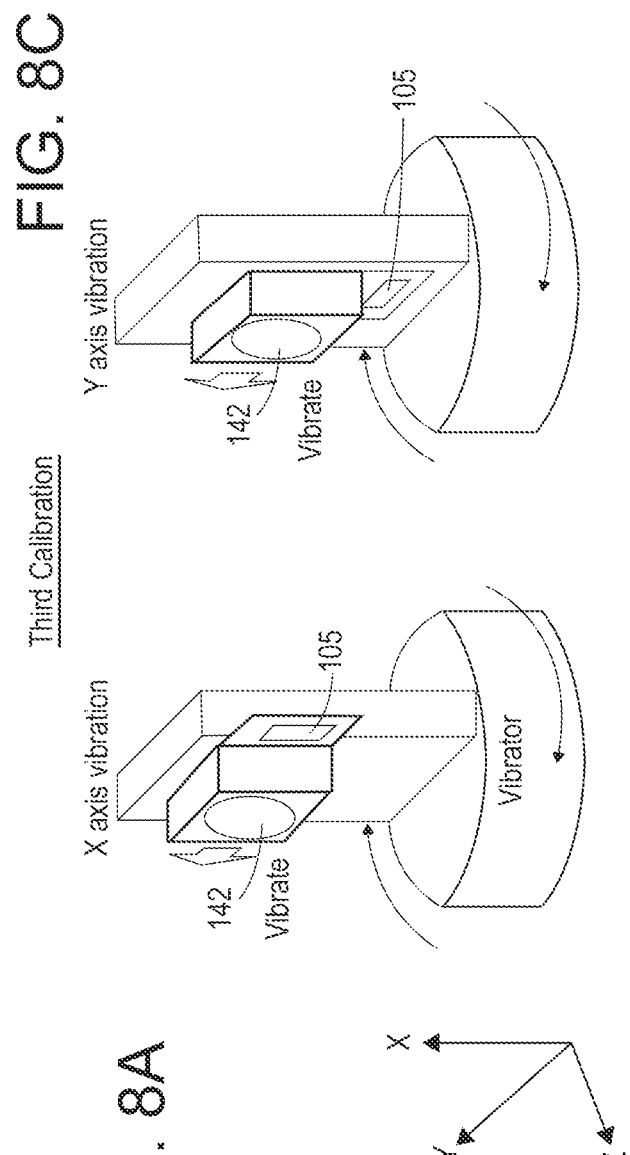

METHODS AND APPARATUS FOR OPTICAL IMAGE STABILIZATION

CROSS-REFERENCE TO RELATED APPLICATIONS

This application is a continuation of U.S. application Ser. No. 17/249,742 filed Mar. 11, 2021 and titled "METHODS AND APPARATUS FOR OPTICAL IMAGE STABILIZATION." The parent application is incorporated by reference herein as if reproduced in full below.

BACKGROUND OF THE TECHNOLOGY

Many electronic devices have an imaging system integrated within them, and in some cases, the electronic device may be turned and/or rotated for the purpose of a desired image capture. In many cases, the imaging system may be controlled by an optical imaging stabilization (OIS) system. In particular, the OIS system may operate to stabilize various components of the imaging system, such as a lens, and to correct for involuntary movements of the electronic device caused by external disturbances, for example movements caused by a shaking hand (hand tremors). However, certain properties of the electronic device may influence the optical image stabilization system and/or the position of the lens. This influence may be due, in part, to how the sensitivity of various components in the imaging system, such as sensors, control circuitry, etc. may vary depending on the particular electronic device being used. In addition, offset errors and/or biases may be introduced into the various components of the system, which may further influence the optical image stabilization system and/or a position of the lens. As a result, given a particular position instruction (code) associated with a respective target position and drive signal, the magnitude of the drive signal needed to move the lens to the target position may be different than the one specified by the position instruction value (code).

SUMMARY OF THE TECHNOLOGY

Various embodiments of the present technology may provide methods and apparatus for optical image stabilization. The methods and apparatus for optical image stabilization may be integrated within an electronic device. An exemplary system may include an actuator control circuit responsive to a sensor and a feedback signal from an actuator. The actuator control circuit may be configured to calibrate a gain applied to a drive signal based on a measured displacement of the electronic device and an output signal generated by the actuator control circuit.

BRIEF DESCRIPTION OF THE FIGURES

A more complete understanding of the present technology may be derived by referring to the detailed description when considered in connection with the following illustrative figures. In the following figures, like reference numbers refer to similar elements and steps throughout the figures.

FIGS. 8A-8C representatively illustrate various actuator orientations for performing the second, third, and fourth calibrations in accordance with an exemplary embodiment of the present technology.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various acceleration sensors, actuators, actuator control circuits, amplifiers, attenuators, calculation circuits, circuitry, coils, controllers, current sources, drivers, filters, image sensors, lens, logic gates, magnets, processors, sensors, semiconductor devices, such as transistors, capacitors, and the like, substrates, signal generators, and voltage sources, which may carry out a variety of functions. In addition, the present technology may be integrated in any number of electronic systems, such as imaging systems, automotive, aviation, "smart devices," portables, medical, scientific, surveillance, and consumer electronics, and the systems described are merely exemplary applications for the technology.

The present technology may be used in conjunction with any position sensor circuit that may be influenced by gravity, centripetal force, tangential force, and sensitivity compensation, such as a position sensor used for motor control and a sensor used for detecting the orientation of a cell phone. Further, the present technology may employ any number of conventional techniques for capturing image data, converting data signals, filtering data signals, generating driver signals, and the like.

Methods and apparatus for optical image stabilization according to various aspects of the present technology may be integrated within any suitable electronic device or system, such as imaging systems, "smart devices," wearables, consumer electronics, and the like. According to various embodiments, the present technology may determine one or more orientations of the electronic device, generate one or more orientation signals, and apply one or more appropriate gain values to the one or more orientation signals to generate a drive signal.

Figure 1:
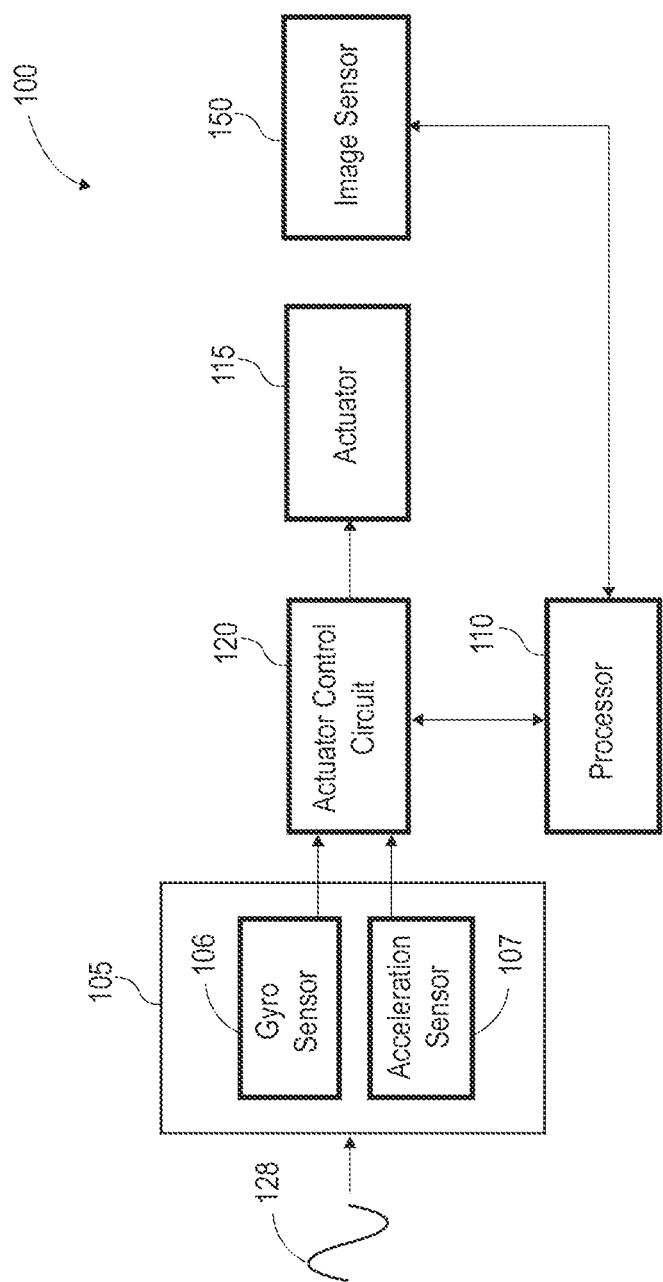
FIG. 1 is a block diagram of an optical image stabilization system in accordance with an exemplary embodiment of the present technology.

Referring to FIG. 1, an exemplary system 100 may be integrated in any suitable electronic device that comprises an image sensor 150, such as a cell phone, tablet, and the like. In various applications, the system 100 may operate to stabilize various components of the imaging system, such as a lens 142 (e.g., as illustrated in FIGS. 8A-8C and 9), and to correct for movements of the cell phone, for example movements caused by involuntary movements, such as hand tremors, or voluntary movements, such as position changes to the electronic device. In the present application, the system 100 may be referred to as an optical image stabilization (OIS) system. According to various embodiments, the system 100 may comprise a sensor 105, an actuator 115, and an actuator control circuit 120. The system 100 may further comprise a processor 110. In an exemplary embodiment, and referring to FIG. 2, the system 100 may be configured as an open-loop system.

The sensor 105 may be configured to measure the orientation, rotation, motion, and/or angular velocity of the electronic device and generate a corresponding signal. The signal may be an analog signal. In particular, the sensor 105 may detect a disturbance signal 128, such as a vibration, or the like, applied to the system 100 and generate a signal in response to detecting the disturbance signal 128. The sensor 105 may comprise at least one of a gyro sensor 106 and an acceleration sensor 107. The disturbance signal may be applied to the system 100 in an x-, y-, and/or a z-axis direction, where the x-axis direction and the y-axis direction may each be defined to be orthogonal to the z-axis direction.

The sensor 105 may be connected to the actuator control circuit 120 and configured to transmit the signal to the actuator control circuit 120. The signal may comprise a first input signal $S_{IN1}$ corresponding to an angular velocity of the device (i.e., a velocity signal $S_{VEL}$) and/or a second input signal $S_{IN2}$ corresponding to an acceleration of the device (i.e., an acceleration signal $S_{ACC}$). The velocity signal may comprise first x-, y-, and z-components, and the acceleration signal $S_{ACC}$ may comprise second x- and y-components. Each component of the velocity signal $S_{VEL}$ and the acceleration signal $S_{ACC}$ may correspond to an axis of an x-y-z reference coordinate system.

The sensor 105 may comprise any suitable sensor system or device configured to detect motion, rotation, and/or angular velocity produced by external disturbances and generate a corresponding electrical signal. The sensor 105 may be selected according to a particular application. For example, the sensor 105 may be selected according to various specifications, such as sensing range, output type, supply current, operating temperature, and the like. In one embodiment, the sensor 105 may be mounted on the electronic device and formed on a separate substrate from the actuator control circuit 120. In another embodiment, the sensor 105 may be formed on the same substrate as the actuator control circuit 120. The substrate may be any suitable substrate, such as a printed circuit board (PCB), or the like.

The actuator 115 may be configured to move the lens 142 along various axes (e.g., x-, y-, and/or z-axes) to improve image quality. The actuator 115 may comprise any suitable device or system capable of moving and/or repositioning the lens 142 in response to a signal. The actuator 115 may correct for involuntary movements of the lens 142 caused by the disturbance signal 128, and may also stabilize imaging by driving the lens 142 in a direction opposite that of the disturbance signal 128 to prevent image blurring.

Figure 9:
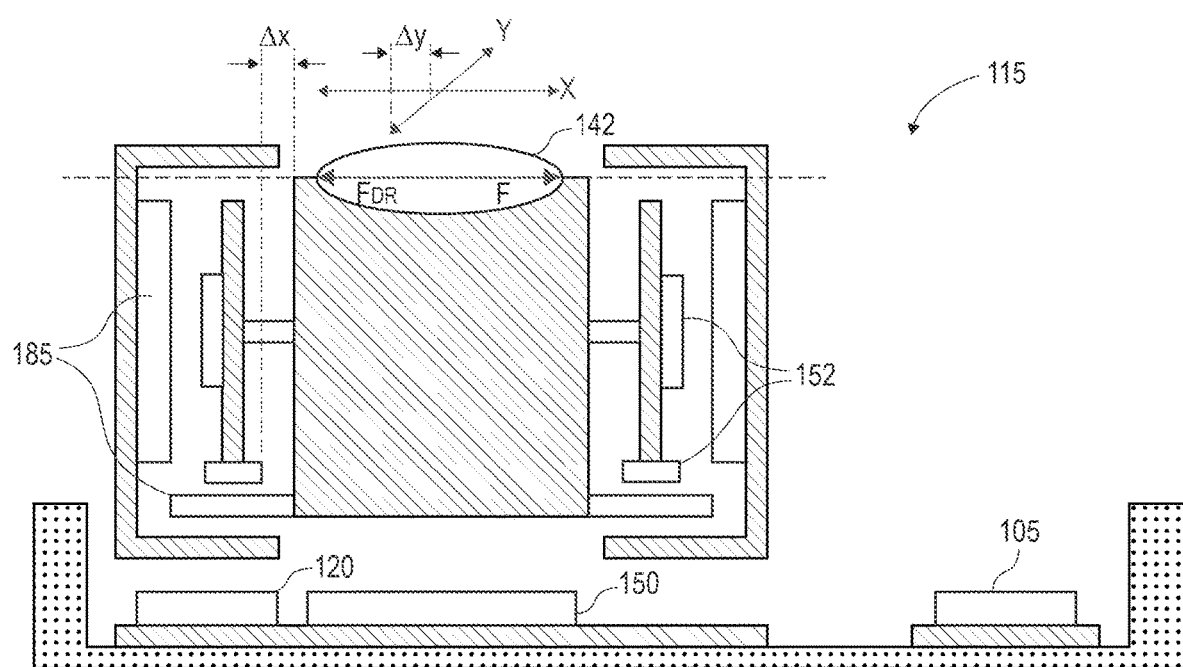
FIG. 9 representatively illustrates an actuator in accordance with an exemplary embodiment of the present technology.

For example, and referring now to FIG. 9, the actuator 115 may be configured as a voice coil motor, comprising a magnet 185 and a coil 152 that is responsive to a drive signal $S_{DR}$ sent from the actuator control circuit 120. The actuator 115 may generate a drive force $F_{DR}$ corresponding to the drive signal $S_{DR}$ and apply the drive force $F_{DR}$ to the lens 142 to position the lens 142 along the x-, y-, and/or z-axis directions. The lens 142 may be moved or otherwise repositioned to correct for any displacement/deviations caused by the disturbance signal 128. The actuator 115 may be limited in the amount of movement it can perform, whether self-limiting or due to the design of the system. For example, the lens 142 may be enclosed in a housing (not shown) with sidewalls. As such, a maximum range of movement the actuator 115 may impart to the lens 142 may be limited by the interior dimensions of the housing.

The lens 142 may comprise any lens or lens system suitable for focusing light on the image sensor 150. For example, in various embodiments, the lens 142 may comprise a single lens element. Alternatively, the lens 142 may comprise a plurality of lens elements arranged adjacent to each other. The lens 142 may operate in conjunction with the actuator 115 and the actuator control circuit 120 to provide the optical image stabilization function. For example, the lens 142 may be configured to move along a plane that is parallel to the sensing surface of the image sensor 150 (i.e., up and down, side-to-side). The lens 142 may be formed using any suitable material, such as glass, quartz glass, fluorite, germanium, meteoritic glass, polycarbonate, plastic, high-index plastic, and the like, or any combination thereof.

The processor 110 may be configured to perform the various processing operations of the system 100, including the processing operations associated with calibrating the drive signal $S_{DR}$. The processor 110 may be configured to enable and/or disable various components in the system 100. For example, the processor 110 may issue time varying commands to the actuator control circuit 120 to generate the drive signal $S_{DR}$. In some embodiments, the processor 110 may be implemented externally to the image sensor 150.

The processor 110 may be further configured to determine the magnitude of the drive signal $S_{DR}$ along with its corresponding drive force $F_{DR}$. In addition, the processor 110 may be further configured to generate various position instruction values $P_{REF(X, Y, Z)}$ and may instruct the system 100 to position the lens 142 in the x-, y-, and/or z-axis direction according to the position instruction values $P_{REF(X, Y, Z)}$. The position instruction values $P_{REF(X, Y, Z)}$ may be generated based on the drive signal $S_{DR}$ and may, for example, indicate the target position and/or the current position of the lens 142. Each position instruction value $P_{REF(X, Y, Z)}$ may correspond to one component (x-, y-, and/or z-component) of the current position and/or the target position of the lens 142. The processor 110 may comprise any suitable processing device, such as microprocessors, application processors, microcontrollers, programmable logic devices, or the like.

Figure 2:
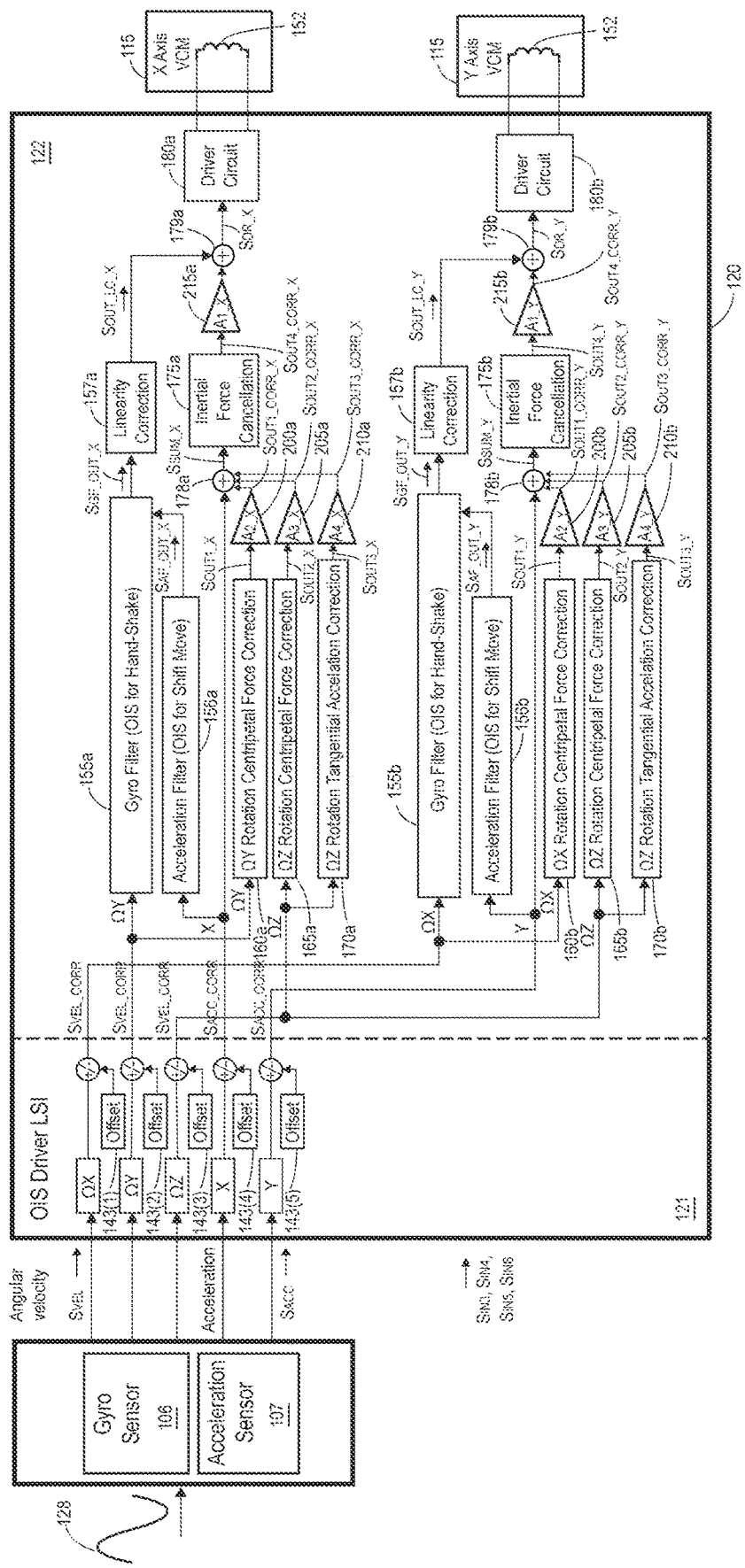
FIG. 2 is a block diagram of an actuator control circuit in accordance with an exemplary embodiment of the present technology.

In various embodiments, and referring now to FIGS. 1-2, the actuator control circuit 120 may be configured to control and supply power to various devices within the system 100. For example, the actuator control circuit 120 may supply power to the actuator 115 via the drive signal $S_{DR}$. The drive signal $S_{DR}$ may comprise a first drive signal $S_{DR\_X}$ and a second drive signal $S_{DR\_Y}$, each drive signal $S_{DR\_X}$, $S_{DR\_Y}$ controlling a respective current or a voltage in the actuator 115, which may in turn control the movement of the actuator 115. For example, the first drive signal $S_{DR\_X}$ may generate a first drive force $F_{DR\_X}$ and the second drive signal $S_{DR\_Y}$ may generate a second drive force $F_{DR\_Y}$. The first drive force $F_{DR\_X}$ may move the position the lens 142 in the x-axis direction and the second drive force $F_{DR\_Y}$ may position the lens 142 in the y-axis direction. Accordingly, the movement of the actuator 115 may be proportional to the magnitude of each drive signal $S_{DR\_X}$, $S_{DR\_Y}$. The actuator control circuit 120 may comprise any suitable control device or system capable of providing energy to the actuator 115.

The actuator control circuit 120 may comprise two axes, each axis comprising a respective driver circuit for transmitting one of the drive signals $S_{DR\_X}$, $S_{DR\_Y}$ to the actuator 115. For example, the actuator control circuit 120 may transmit the first drive signal $S_{DR\_X}$ to the actuator 115 via a first driver circuit 180a. Similarly, the actuator control circuit 120 may transmit the second drive signal $S_{DR\_Y}$ to the actuator 115 via a second driver circuit 180b.

In various embodiments, the actuator control circuit 120 may receive and respond to a feedback signal, such as a hall sensor signal from a hall sensor (not shown). The hall sensor (not shown) may be configured to detect an actual position of the actuator 115 and/or the lens 142. The actuator control circuit 120 may utilize the feedback signal in conjunction with the velocity signal $S_{VEL}$ and/or the acceleration signal $S_{ACC}$ to determine an appropriate amount of power to supply to the actuator 115 based on a desired lens position.

According to an exemplary embodiment, the actuator control circuit 120 may comprise a first circuit portion 121 configured to receive the acceleration signal $S_{ACC}$ and/or the velocity signal $S_{VEL}$ and generate an offset-corrected acceleration signal $S_{ACC\_CORR}$ and an offset-corrected velocity signal $S_{VEL\_CORR}$ according to the acceleration signal $S_{ACC}$ and the velocity signal $S_{VEL}$, respectively. The first circuit portion 121 may comprise any suitable computation circuit configured to receive each component of the acceleration signal $S_{ACC}$ and/or the velocity signal $S_{VEL}$ and remove noise signals from each component.

In an ideal system, the sensitivity of the sensor 105 may be a constant value. However, in practice, the sensitivity of the sensor 105 may change across each electronic device (i.e., module). As the sensitivity of the sensor 105 changes across each module, noise signals may be introduced into each component of the acceleration signal $S_{ACC}$ and the velocity signal $S_{VEL}$. The noise signals may be in the form of DC offset errors and/or biases and are thus an unwanted addition to each component of the acceleration signal $S_{ACC}$ and/or the velocity signal $S_{VEL}$. The introduction of DC offset errors and/or biases may negatively impact the performance of the various components of the system 100, including various sub-components of the actuator control circuit 120.

For example, various sub-components of the actuator control circuit 120 may be configured to receive specific components of the acceleration signal $S_{ACC}$ and/or the velocity signal $S_{VEL}$ and perform a variety of processing operations on the components to generate the drive signal $S_{DR}$. Accordingly, any DC offset errors and/or biases present in the components of the acceleration signal $S_{ACC}$ and/or the velocity signal $S_{VEL}$ may result in a mismatch between the drive signal $S_{DR}$ that is generated by the actuator control circuit 120 and the desired drive signal $S_{DR}$. Given that the drive signal $S_{DR}$ may correspond to a particular current value applied to the actuator 115, when a particular lens position is desired, the actual amount of current required by the actuator 115 to move the lens 142 to the target position may be different than the current value determined by the actuator control circuit 120. Consequently, a changing sensitivity of the sensor 105 along with the DC offset errors and/or biases may cause an under correction of the lens position or an over correction of the lens position.

The magnitude of each DC offset error and/or bias may depend on the type of sensor 105 used in the system 100 and may be influenced by certain factors, such as the size of the sensor 105 and/or the temperature of the environment in which the sensor 105 is operating in. The magnitude of each DC offset error and/or bias may be determined by computing a plurality of values, where each value is an average of a respective one of the components of the acceleration signal $S_{ACC}$ and/or the velocity signal $S_{VEL}$, and then comparing each computed average value to its respective component. For example, three average values may be computed for the acceleration signal $S_{ACC}$ (i.e., one for each of the first x-, y-, and z-components), and two average values may be computed for the velocity signal $S_{VEL}$ (i.e., one for each of the second x- and y-components). The difference between the computed average value and the amplitude of its respective component may represent the DC offset error and/or bias.

According to an exemplary embodiment, the first circuit portion 121 may comprise a plurality of registers 143, such as registers 143(1)~143(5), and each register 143 may be configured to store a respective one of the plurality of average values. For example, in this case where the velocity signal $S_{VEL}$ comprises three components and the acceleration signal $S_{ACC}$ comprises two components, the actuator control circuit 120 may comprise five registers 143(1)~143(5).

It will be appreciated that a large number of readings may be taken from the sensor 105 such that an average of each component of the acceleration signal $S_{ACC}$ and/or the velocity signal $S_{VEL}$ may be determined to more accurately determine the magnitude of each of the DC offset errors and/or biases. Accordingly, the first circuit portion 121 may be configured to generate the offset-corrected acceleration signal $S_{ACC\_CORR}$ by subtracting a signal equal in magnitude to the noise signal from each of the x- and y-components of the acceleration signal $S_{ACC}$. Similarly, the first circuit portion 121 may be configured to generate the offset-corrected velocity signal $S_{VEL\_CORR}$ by subtracting a signal equal in magnitude to the noise signal from each of the x-, y-, and z-components of the velocity signal $S_{VEL}$. The first circuit portion 121 may be further configured to transmit the offset-corrected acceleration signal $S_{ACC\_CORR}$ and the offset-corrected velocity signal $S_{VEL\_CORR}$ to a second circuit portion 122 for additional processing.

The first circuit portion 121 and the second circuit portion 122 may operate in conjunction with each other to perform an exemplary calibration scheme to compensate for the effect that the changing sensitivity of the sensor 105 and/or the DC offset errors and/or biases present in the velocity signal $S_{VEL}$ and the acceleration signal $S_{ACC}$ have on various components of the system 100, including various sub-components of the actuator control circuit 120.

The second circuit portion 122 may be configured to receive the offset-corrected acceleration signal $S_{ACC\_CORR}$ and the offset-corrected velocity signal $S_{VEL\_CORR}$ and generate the drive signal $S_{DR}$ according to the offset-corrected acceleration signal $S_{ACC\_CORR}$ and the offset-corrected velocity signal $S_{VEL\_CORR}$.

In various embodiments, the second circuit portion 122 may comprise a first sub-circuit (i.e., a first centripetal force correction circuit 160a), a second sub-circuit (i.e., a second centripetal force correction circuit 165a), a third sub-circuit (i.e., a first tangential acceleration correction circuit 170a), a fourth sub-circuit (i.e., a third centripetal force correction circuit 160b), a fifth sub-circuit (i.e., a fourth centripetal force correction circuit 165b), a sixth sub-circuit (i.e., a second tangential acceleration correction circuit 170b), a seventh sub-circuit (i.e., a first inertial force cancellation circuit 175a), an eighth sub-circuit (i.e., a second inertial force cancellation circuit 175b), a first amplifier 200a, a second amplifier 205a, a third amplifier 210a, a fourth amplifier 215a, a fifth amplifier 200b, a sixth amplifier 205b, a seventh amplifier 210b, and an eighth amplifier 215b.

The first centripetal force correction circuit 160a may be configured to receive the y-component of the velocity signal $S_{VEL}$ and generate a first x-axis output signal $S_{OUT1\_X}$ according to the y-component of the velocity signal $S_{VEL}$. The first centripetal force correction circuit 160a may comprise an output terminal.

In various embodiments, the first centripetal force correction circuit 160a may be configured to receive the y-component of the velocity signal $S_{VEL}$ and/or the x-component of the acceleration signal $S_{ACC}$ and correct for a mismatch between the magnitude of the x-component of the acceleration that is applied to the sensor 105 by the disturbance signal 128 and the magnitude of the x-component of the acceleration that is ultimately applied to the actuator 115. For example, if the sensor 105 is displaced due to voluntary and/or involuntary movement, such as a rotation, the magnitude of the x-component of the acceleration that is applied to the sensor 105 may be different than the magnitude of the x-component of the acceleration that is ultimately applied to the actuator 115.

In various embodiments, the first centripetal force correction circuit 160a may comprise any circuit and/or system suitable for performing various transformations and calculations, such as division, multiplication, and the like. For example, the first centripetal force correction circuit 160a may comprise a system of logic circuits or a field programmable gate array circuit.

The second centripetal force correction circuit 165a may be configured to receive the z-component of the velocity signal $S_{VEL}$ and generate a second x-axis output signal $S_{OUT2\_X}$ according to the z-component of the velocity signal $S_{VEL}$. The second centripetal force correction circuit 165a may comprise an output terminal.

In various embodiments, the second centripetal force correction circuit 165a may be configured to receive the z-component of the velocity signal $S_{VEL}$ and/or the x-component of the acceleration signal $S_{ACC}$ and correct for a mismatch between the magnitude of the x-component of the acceleration that is applied to the sensor 105 by the disturbance signal 128 and the magnitude of the x-component of the acceleration that is ultimately applied to the actuator 115. For example, if the sensor 105 is displaced due to voluntary and/or involuntary movement, such as a rotation, the magnitude of the x-component of the acceleration that is applied to the sensor 105 may be different than the magnitude of the x-component of the acceleration that is ultimately applied to the actuator 115.

In various embodiments, the second centripetal force correction circuit 165a may comprise any circuit and/or system suitable for performing various transformations and calculations, such as division, multiplication, and the like. For example, the second centripetal force correction circuit 165a may comprise a system of logic circuits or a field programmable gate array circuit.

The first tangential acceleration correction circuit 170a may be configured to receive the z-component of the velocity signal $S_{VEL}$ and generate a third x-axis output signal $S_{OUT3\_X}$ according to the z-component of the velocity signal $S_{VEL}$. The first tangential acceleration correction circuit 170a may comprise an output terminal In various embodiments, the first tangential acceleration correction circuit 170a may be configured to correct for a mismatch between the magnitude of the x-component of the acceleration that is applied to the sensor 105 by the disturbance signal 128 and the magnitude of the x-component of the acceleration signal that is ultimately applied to the actuator 115.

For example, if the sensor 105 is displaced due to voluntary and/or involuntary movement, such as a rotation, the magnitude of the x-component of the acceleration applied to the sensor 105 may be different than the magnitude of the x-component of the acceleration that is ultimately applied to the actuator 115. This difference may be due, in part, to the different tangential accelerations applied to the sensor 105 and the actuator 115.

The first tangential acceleration correction circuit 170a may be further configured to transmit the third x-axis output signal $S_{OUT3\_X}$ to the third amplifier 210a for further processing.

In various embodiments, the first tangential acceleration correction circuit 170a may comprise any circuit and/or system suitable for performing various transformations and calculations, such as division, multiplication, and the like. For example, the first tangential acceleration correction circuit 170a may comprise a system of logic circuits or a field programmable gate array circuit.

The first amplifier 200a may be connected to the output terminal of the first centripetal force correction circuit 160a. The first amplifier 200a may be configured to receive the first x-axis output signal $S_{OUT1\_X}$ and generate a first corrected x-axis output signal $S_{OUT1\_CORR\_X}$ according to the first x-axis output signal $S_{OUT1\_X}$. The first amplifier 200a may apply a second x-axis correction gain $A_{2\_X}$ to the first x-axis output signal $S_{OUT1\_X}$. After the second x-axis correction gain $A_{2\_X}$ has been applied to the first x-axis output signal $S_{OUT1\_X}$, the resulting first corrected x-axis output signal $S_{OUT1\_CORR\_X}$ may be sent to a first addition circuit 178a for further processing. The first amplifier 200a may comprise an amplifier circuit or any other circuit and/or system suitable for receiving an input signal and applying a gain to the input signal.

The second amplifier 205a may be connected to the output terminal of the second centripetal force correction circuit 165a. The second amplifier 205a may be configured to receive the second x-axis output signal $S_{OUT2\_X}$ and generate a second corrected x-axis output signal $S_{OUT2\_CORR\_X}$ according to the second output signal $S_{OUT2\_X}$. For example, the second amplifier 205a may apply a third x-axis correction gain $A_{3\_X}$ to the second x-axis output signal $S_{OUT2\_X}$. After the third x-axis correction gain $A_{3\_X}$ has been applied to the second x-axis output signal $S_{OUT2\_X}$, the resulting second corrected x-axis output signal $S_{OUT2\_CORR\_X}$ may be sent to the first addition circuit 178a for further processing. The second amplifier 205a may comprise an amplifier circuit or any other circuit and/or system suitable for receiving an input signal and applying a gain to the input signal.

The third amplifier 210a may be connected to the output terminal of the first tangential acceleration correction circuit 170a. The third amplifier 210a may be configured to receive the third x-axis output signal $S_{OUT3\_X}$ and generate a third corrected x-axis output signal $S_{OUT3\_CORR\_X}$ according to the third x-axis output signal $S_{OUT3\_X}$. For example, the third amplifier 210a may apply a fourth x-axis correction gain $A_{4\_X}$ to the third x-axis output signal $S_{OUT3\_X}$. After the fourth x-axis correction gain $A_{4\_X}$ has been applied to the third x-axis output signal $S_{OUT3\_X}$, the resulting third corrected x-axis output signal $S_{OUT3\_CORR\_X}$ may be sent to the first addition circuit 178a for further processing. The third amplifier 210a may comprise an amplifier circuit or any other circuit and/or system suitable for receiving an input signal and applying a gain to the input signal.

The first inertial force cancellation circuit 175a may comprise an input terminal connected to an output terminal of the first addition circuit 178a. The first addition circuit 178a may be capable of generating a first summed signal $S_{SUM\_X}$ by adding the corrected x-axis output signals $S_{OUT1\_CORR\_X}$, $S_{OUT2\_CORR\_X}$, $S_{OUT3\_CORR\_X}$ and the x-component of the acceleration signal $S_{ACC}$ to each other. The first addition circuit 178a may then transmit the first summed signal $S_{SUM\_X}$ to the first inertial force cancellation circuit 175a for further processing.

In various embodiments, the first inertial force cancellation circuit 175a may be configured to receive the first summed signal $S_{SUM\_X}$ and apply a gain to the first summed signal $S_{SUM\_X}$ based on the x-component of the target position of the lens 142 to compensate for the effect that gravity and the disturbance signal 128 have on various components in the system 100, including the lens 142.

The first inertial force cancellation circuit 175a may be further configured to generate a fourth x-axis output signal $S_{OUT4\_X}$ according to the first summed signal $S_{SUM\_X}$. For example, the first inertial force cancellation circuit 175a may amplify the first summed signal $S_{SUM\_X}$ by one or more predetermined coefficients to match the amplitude of the first drive signal $S_{DR\_X}$ that is needed to produce the requisite first drive force $F_{DR\_X}$ to cancel out the inertial force applied to the lens 142 by gravity and the disturbance signal 128. The first inertial force cancellation circuit 175a may be further configured to transmit the fourth x-axis output signal $S_{OUT4\_X}$ to the fourth amplifier 215a for additional processing.

The fourth amplifier 215a may be connected to the output terminal of the first inertial force cancellation circuit 175a. The fourth amplifier 215a may be configured to receive the fourth x-axis output signal $S_{OUT4\_X}$ and generate a fourth corrected x-axis output signal $S_{OUT4\_CORR\_X}$ according to the fourth x-axis output signal $S_{OUT4\_X}$. For example, the fourth amplifier 215a may apply a first x-axis correction gain $A_{1\_X}$ to the fourth x-axis output signal $S_{OUT4\_X}$. After the first x-axis correction gain $A_{1\_X}$ has been applied to the fourth x-axis output signal $S_{OUT4\_X}$, the resulting fourth corrected x-axis output signal $S_{OUT4\_CORR\_X}$ may be sent to another circuit component, such as a second addition circuit 179a, for further processing. The fourth amplifier 215a may comprise an amplifier circuit or any other circuit and/or system suitable for receiving an input signal and applying a gain to the input signal.

The third centripetal force correction circuit 160b may be configured to receive the x-component of the velocity signal $S_{VEL}$ and generate a first y-axis output signal $S_{OUT1\_Y}$ according to the x-component of the velocity signal $S_{VEL}$. The third centripetal force correction circuit 160b may comprise an output terminal.

In various embodiments, the third centripetal force correction circuit 160b may be configured to receive the x-component of the velocity signal $S_{VEL}$ and/or the y-component of the acceleration signal $S_{ACC}$ and correct for a mismatch between the magnitude of the y-component of the acceleration that is applied to the sensor 105 by the disturbance signal 128 and the magnitude of the y-component of the acceleration that is ultimately applied to the actuator 115. For example, if the sensor 105 is displaced due to voluntary and/or involuntary movement, such as a rotation, the magnitude of the y-component of the acceleration that is applied to the sensor 105 may be different than the magnitude of the y-component of the acceleration that is ultimately applied to the actuator 115. The third centripetal force correction circuit 160b may be further configured to transmit the first y-axis output signal $S_{OUT1\_Y}$ to the fifth amplifier 200b for additional processing.

In various embodiments, the third centripetal force correction circuit 160b may comprise any circuit and/or system suitable for performing various transformations and calculations, such as division, multiplication, and the like. For example, the third centripetal force correction circuit 160b may comprise a system of logic circuits or a field programmable gate array circuit.

The fourth centripetal force correction circuit 165b may be configured to receive the z-component of the velocity signal $S_{VEL}$ and generate a second y-axis output signal $S_{OUT2\_Y}$ according to the z-component of the velocity signal $S_{VEL}$. The fourth centripetal force correction circuit 165b may comprise an output terminal.

In various embodiments, the fourth centripetal force correction circuit 165b may be configured to receive the z-component of the velocity signal $S_{VEL}$ and/or the y-component of the acceleration signal $S_{ACC}$ and correct for a mismatch between the magnitude of the y-component of the acceleration that is applied to the sensor 105 by the disturbance signal 128 and the magnitude of the y-component of the acceleration that is ultimately applied to the actuator 115. For example, if the sensor 105 is displaced due to voluntary and/or involuntary movement, such as a rotation, the magnitude of the y-component of the acceleration that is applied to the sensor 105 may be different than the magnitude of the y-component of the acceleration that is ultimately applied to the actuator 115.

The fourth centripetal force correction circuit 165b may be further configured to transmit the second y-axis output signal $S_{OUT2\_Y}$ to the sixth amplifier 205b for further processing.

In various embodiments, the fourth centripetal force correction circuit 165b may comprise any circuit and/or system suitable for performing various transformations and calculations, such as division, multiplication, and the like. For example, the fourth centripetal force correction circuit 165b may comprise a system of logic circuits or a field programmable gate array circuit.

The second tangential acceleration correction circuit 170b may be configured to receive the z-component of the velocity signal $S_{VEL}$ and generate a third y-axis output signal $S_{OUT3\_Y}$ according to the z-component of the velocity signal $S_{VEL}$. The second tangential acceleration correction circuit 170b may comprise an output terminal.

In various embodiments, the second tangential acceleration correction circuit 170b may be configured to correct for a mismatch between the y-component of the acceleration that is applied to the sensor 105 by the disturbance signal 128 and the y-component of the acceleration signal that is ultimately applied to the actuator 115.

For example, if the sensor 105 is displaced due to voluntary and/or involuntary movement, such as a rotation, the magnitude of the y-component of the acceleration applied to the sensor 105 may be different than the magnitude of the y-component of the acceleration that is ultimately applied to the actuator 115. This may be due, in part, to the different tangential accelerations applied to the sensor 105 and the actuator 115.

The second tangential acceleration correction circuit 170b may be further configured to transmit the third y-axis output signal $S_{OUT3\_Y}$ to the seventh amplifier 210b for further processing.

In various embodiments, the second tangential acceleration correction circuit 170b may comprise any circuit and/or system suitable for performing various transformations and calculations, such as division, multiplication, and the like. For example, the second tangential acceleration correction circuit 170b may comprise a system of logic circuits or a field programmable gate array circuit.

The fifth amplifier 200b may be connected to the output terminal of the third centripetal force correction circuit 160b. The fifth amplifier 200b may be configured to receive the first y-axis output signal $S_{OUT1\_Y}$ and generate a first corrected y-axis output signal $S_{OUT1\_CORR\_Y}$ according to the first y-axis output signal $S_{OUT1\_Y}$. The fifth amplifier 200b may apply a second y-axis correction gain $A_{2\_Y}$ to the first y-axis output signal $S_{OUT1\_Y}$. After the second y-axis correction gain $A_{2\_Y}$ has been applied to the first y-axis output signal $S_{OUT1\_Y}$, the resulting first corrected y-axis output signal $S_{OUT1\_CORR\_Y}$ may be sent to a third addition circuit 178b for further processing. The fifth amplifier 200b may comprise an amplifier circuit or any other circuit and/or system suitable for receiving an input signal and applying a gain to the input signal.

The sixth amplifier 205b may be connected to the output terminal of the fourth centripetal force correction circuit 165b. The sixth amplifier 205b may be configured to receive the second y-axis output signal $S_{OUT2\_Y}$ and generate a second corrected y-axis output signal $S_{OUT2\_CORR\_Y}$ according to the second y-axis output signal $S_{OUT2\_Y}$. For example, the sixth amplifier 205b may apply a third y-axis correction gain $A_{3\_Y}$ to the second y-axis output signal $S_{OUT2\_Y}$. After the third y-axis correction gain $A_{3\_Y}$ has been applied to the second y-axis output signal $S_{OUT2\_Y}$, the resulting second corrected y-axis output signal $S_{OUT2\_CORR\_Y}$ may be sent to the third addition circuit 178b for further processing. The sixth amplifier 205b may comprise an amplifier circuit or any other circuit and/or system suitable for receiving an input signal and applying a gain to the input signal.

The seventh amplifier 210b may be connected to the output terminal of the second tangential acceleration correction circuit 170b. The seventh amplifier 210b may be configured to receive the third y-axis output signal $S_{OUT3\_Y}$ and generate a third corrected y-axis output signal $S_{OUT3\_CORR\_Y}$ according to the third y-axis output signal $S_{OUT3\_Y}$. For example, the seventh amplifier 210b may apply a fourth y-axis correction gain $A_{4\_Y}$ to the third y-axis output signal $S_{OUT3\_Y}$. After the fourth y-axis correction gain $A_{4\_Y}$ has been applied to the third y-axis output signal $S_{OUT3\_Y}$, the resulting third corrected y-axis output signal $S_{OUT3\_CORR\_Y}$ may be sent to the third addition circuit 178b for further processing. The seventh amplifier 210b may comprise an amplifier circuit or any other circuit and/or system suitable for receiving an input signal and applying a gain to the input signal.

The second inertial force cancellation circuit 175b may comprise an input terminal connected to an output terminal of the third addition circuit 178b. The third addition circuit 178b may be capable of generating a second summed signal $S_{SUM\_Y}$ by adding the corrected y-axis output signals $S_{OUT1\_CORR\_Y}$, $S_{OUT2\_CORR\_Y}$, $S_{OUT3\_CORR\_Y}$ and the y-component of the acceleration signal $S_{ACC}$ to each other. The third addition circuit 178b may then transmit the second summed signal $S_{SUM\_Y}$ to the second inertial force cancellation circuit 175b for further processing.

In various embodiments, the second inertial force cancellation circuit 175b may be configured to receive the second summed signal $S_{SUM\_Y}$ and apply a gain to the second summed signal $S_{SUM\_Y}$ based on the y-component of the target position of the lens 142 to compensate for the effect that gravity and the disturbance signal 128 have on various components in the system 100, such as the lens 142.

The second inertial force cancellation circuit 175b may be further configured to generate a fourth y-axis output signal $S_{OUT4\_Y}$ according to the second summed signal $S_{SUM\_Y}$. For example, the second inertial force cancellation circuit 175b may amplify the second summed signal $S_{SUM\_Y}$ by one or more predetermined coefficients to match the amplitude of the second drive signal $S_{DR\_Y}$ that is needed to produce the requisite second drive force $F_{DR\_Y}$ to cancel out the inertial force applied to the lens 142 by gravity and the disturbance signal 128. The second inertial force cancellation circuit 175b may be further configured to transmit the fourth y-axis output signal $S_{OUT4\_Y}$ to the eighth amplifier 215b for additional processing.

Each inertial force cancellation circuit 175a, 175b may be configured to perform various functions, such as filtering, amplification, signal conversion, analysis and the like, to compensate for the effect that gravity and the disturbance signal 128 has on various components in the system 100. For example, the first inertial force cancellation circuit 175a may comprise one or more suitable filters capable of attenuating various frequencies of the first summed signal $S_{SUM\_X}$ in order to substantially eliminate any phase offset errors present in the first summed signal $S_{SUM\_X}$, such as a low-boost filter, a high-boost filter, or the like. Similarly, the second inertial force cancellation circuit 175b may comprise one or more suitable filters capable of attenuating various frequencies of the second summed signal $S_{SUM\_Y}$ in order to substantially eliminate any phase offset errors present in the second summed signal $S_{SUM\_Y}$, such as a low-boost filter, a high-boost filter, or the like.

In various embodiments, each inertial force cancellation circuit 175a, 175b may further comprise any suitable signal gain controller capable of amplifying one of the first and second summed signals $S_{SUM\_X}$, $S_{SUM\_Y}$, such as an attenuator, amplifier, or the like. For example, and referring now to FIG. 9, the dashed line shows a state in which the inertial force correction is not enabled. When the system 100 is acted upon by the disturbance signal 128, the lens 142 may experience the inertial force, F. If the correction is not enabled, the lens 142 may, for example, deviate by $\Delta x$ and/or $\Delta y$ from the target position. Given a particular position instruction value associated with a respective target position, the actual lens position may not be equal to the target position. The position instruction value may correspond to a particular current value applied to the actuator 115, so when a particular lens position is desired, the actual amount of current required by the actuator 115 may be different than the one specified by the position instruction value. This problem may be exacerbated by a changing sensitivity of the sensor 105 and/or the DC offset errors and/or biases present in the acceleration signal $S_{ACC}$ and/or the velocity signal $S_{VEL}$.

The eighth amplifier 215b may be connected to the output terminal of the second inertial force cancellation circuit 175b. The eighth amplifier 215b may be configured to receive the fourth y-axis output signal $S_{OUT4\_Y}$ and generate a fourth corrected y-axis output signal $S_{OUT4\_CORR\_Y}$ according to the fourth y-axis output signal $S_{OUT4\_Y}$. For example, the eighth amplifier 215b may apply a first y-axis correction gain $A_{1\_Y}$ to the fourth y-axis output signal $S_{OUT4\_Y}$. After the first y-axis correction gain $A_{1\_Y}$ has been applied to the fourth y-axis output signal $S_{OUT4\_Y}$, the resulting fourth corrected y-axis output signal $S_{OUT4\_CORR\_Y}$ may be sent to another circuit component, such as a fourth addition circuit 179b, for further processing. The eighth amplifier 215b may comprise an amplifier circuit or any other circuit and/or system suitable for receiving an input signal and applying a gain to the input signal.

It will be appreciated that: the first x-axis output signal $S_{OUT1\_X}$ may be different than the first y-axis output signal $S_{OUT1\_Y}$; the second x-axis output signal $S_{OUT2\_X}$ may be different than the second y-axis output signal $S_{OUT2\_Y}$; the third x-axis output signal $S_{OUT3\_X}$ may be different than the third y-axis output signal $S_{OUT3\_Y}$; and the fourth x-axis output signal $S_{OUT4\_X}$ may be different than the fourth y-axis output signal $S_{OUT4\_Y}$. Accordingly, it will also be appreciated that: the first corrected x-axis output signal $S_{OUT1\_CORR\_X}$ may be different than the first corrected y-axis output signal $S_{OUT1\_CORR\_Y}$; the second corrected x-axis output signal $S_{OUT2\_CORR\_X}$ may be different than the second corrected y-axis output signal $S_{OUT2\_CORR\_Y}$; the third corrected x-axis output signal $S_{OUT3\_CORR\_X}$ may be different than the third corrected y-axis output signal $S_{OUT3\_CORR\_Y}$; and the fourth corrected x-axis output signal $S_{OUT4\_CORR\_X}$ may be different than the fourth corrected y-axis output signal $S_{OUT4\_CORR\_Y}$.

According to various embodiments, the system 100 may further comprise a memory (not shown) configured to store the computed correction gain values $\Delta_{1\_X}$-$\Delta_{4\_X}$ and $\Delta_{1\_Y}$-$\Delta_{4\_Y}$. In addition, the memory (not shown) may be configured to store one or more of the computed average values. The memory may comprise a flash memory or any other suitable memory type. The memory may be integrated within the actuator control circuit 120, or alternatively, may be formed on a companion circuit that is accessible to the actuator control circuit 120.

The second circuit portion 122 may further comprise a first gyro filter 155a and a second gyro filter 155b. In addition, the second circuit portion 122 may further comprise a first acceleration filter 156a and a second acceleration filter 156b.

In various embodiments, and referring now to FIG. 2, the gyro filters 155a, 155b and the acceleration filters 156a, 156b may perform various functions on a signal (e.g., the velocity signal $S_{VEL}$ and the acceleration signal $S_{ACC}$), such as integration and frequency characteristic adjustment (i.e., DC cutting). For example, the gyro filters 155a, 155b and the acceleration filters 156a, 156b may integrate an angular velocity of the velocity signal $S_{VEL}$ and an angular acceleration of the acceleration signal $S_{ACC}$, respectively, and prevent transmission of the signals at undesired frequencies. The gyro filters 155a, 155b and the acceleration filters 156a, 156b may be connected between the sensor 105 and the first and second driver circuits 180a, 180b. In various embodiments, the gyro filters 155a, 155b and the acceleration filters 156a, 156b may each comprise an interface (I/F) circuit (not shown) and an integrator circuit (not shown). The gyro filters 155a, 155b and the acceleration filters 156a, 156b may operate in conjunction with each other to calculate the target position of the lens 142.

In various embodiments, each gyro filter 155a, 155b may comprise an input terminal and may be configured to receive one of the x- and y-components of the velocity signal $S_{VEL}$. Each gyro filter 155a, 155b may be configured to utilize one of the x- and y-components of the velocity signal $S_{VEL}$ to generate a respective gyro filter output signal. For example, the first gyro filter 155a may be configured to receive the y-component of the velocity signal $S_{VEL}$ and generate a first gyro filter output signal $S_{GF\_OUT\_X}$ according to the y-component of the velocity signal $S_{VEL}$. Similarly, the second gyro filter 155b may be configured to receive the x-component of the velocity signal $S_{VEL}$ and generate a second gyro filter output signal $S_{GF\_OUT\_Y}$ according to the x-component of the velocity signal $S_{VEL}$.

Each gyro filter output signal $S_{GF\_OUT\_X}$, $S_{GF\_OUT\_Y}$ may control a current or a voltage in the actuator 115, which may control the movement of the actuator 115. Accordingly, the movement of the actuator 115 (or a portion of the actuator 115) may be proportional to the magnitude of each gyro filter output signal $S_{GF\_OUT\_X}$, $S_{GF\_OUT\_Y}$. Each gyro filter output signal $S_{GF\_OUT\_X}$, $S_{GF\_OUT\_Y}$ may comprise any suitable drive signal, such as current signals, voltage signals, and the like.

The first gyro filter 155a may be further configured to transmit the first gyro filter output signal $S_{GF\_OUT\_X}$ to another portion and/or sub-circuit of the actuator control circuit 120 for further processing. For example, the first gyro filter 155a may transmit the first gyro filter output signal $S_{GF\_OUT\_X}$ to a first linearity correction circuit 157a where a gain may be applied to it. Similarly, the second gyro filter 155b may be further configured to transmit the second gyro filter output signal $S_{GF\_OUT\_Y}$ to another portion and/or sub-circuit of the actuator control circuit 120 for further processing. For example, the second gyro filter 155b may transmit the second gyro filter output signal $S_{GF\_OUT\_Y}$ to a second linearity correction circuit 157b where a gain may be applied to it.

In various embodiments, each gyro filter 155a, 155b may convert one of the x- and y-components of the velocity signal $S_{VEL}$ to a respective shake angle, where each shake angle may be associated with one of the x- and y-components of the velocity signal $S_{VEL}$. The gyro filters 155a, 155b may determine the target position of the lens 142 in each direction according to their respective shake angles. For example, the first gyro filter 155a may receive the y-component of the velocity signal $S_{VEL}$ and compute an integration to generate its respective shake angle. The first gyro filter 155a may then determine the target position of the lens 142 in the x-axis direction according to the calculated shake angle. The first gyro filter 155a may transmit the target position, in the form of the first gyro filter output signal $S_{GF\_OUT\_X}$, to the first linearity correction circuit 157a for additional processing.

In various embodiments, each acceleration filter 156a, 156b may comprise an input terminal and is configured to receive one of the x- and y-components of the acceleration signal $S_{ACC}$. For example, the first acceleration filter 156a may be configured to receive the x-component of the acceleration signal $S_{ACC}$, and the second acceleration filter 156b may be configured to receive the y-component of the acceleration signal $S_{ACC}$.

In various embodiments, the acceleration filters 156a, 156b may be configured to utilize one of the x- and y-components of the acceleration signal $S_{ACC}$ to generate a respective acceleration filter output signal. For example, the first acceleration filter 156a may be configured to generate a first acceleration filter output signal $S_{AF\_OUT\_X}$ according to the x-component of the acceleration signal $S_{ACC}$. Similarly, the second acceleration filter 156b may be configured to generate a second acceleration filter output signal $S_{AF\_OUT\_Y}$ according to the y-component of the acceleration signal $S_{ACC}$.

Each acceleration filter output signal $S_{AF\_OUT\_X}$, $S_{AF\_OUT\_Y}$ may control a current or a voltage in the actuator 115, which may control the movement of the actuator 115. Accordingly, the movement of the actuator 115 (or a portion of the actuator 115) may be proportional to the magnitude of each acceleration filter output signal $S_{AF\_OUT\_X}$, $S_{AF\_OUT\_Y}$.

Each acceleration filter output signal $S_{AF\_OUT\_X}$, $S_{AF\_OUT\_Y}$ may comprise any suitable drive signal, such as current signals, voltage signals, and the like.

The first acceleration filter 156a may be further configured to transmit the first acceleration filter output signal $S_{AF\_OUT\_X}$ to another portion and/or sub-circuit of the actuator control circuit 120, such as the first gyro filter 155a, for further processing. Similarly, the second acceleration filter 156b may be further configured to transmit the second acceleration filter output signal $S_{AF\_OUT\_Y}$ to another portion and/or sub-circuit of the actuator control circuit 120, such as the second gyro filter 155b, for further processing.

In various embodiments, the acceleration filters 156a, 156b may perform a double-integration of the x- and y-components of the acceleration signal $S_{ACC}$ to generate a respective position signal of the lens 142. The position signal may be used to compute a deviation from the target position. The acceleration filters 156a, 156b may transmit their respective computed deviations, in the form of the acceleration filter output signals $S_{AF\_OUT\_X}$, $S_{AF\_OUT\_Y}$, respectively, to another portion of the actuator control circuit 120, such as the gyro filters 155a, 155b, where the computed deviations may be used to determine the target position to be set for the lens 142 in the x- and y-axis directions. Each target position may be relative to a reference point on the x-y-z reference coordinate system and gravity.

To compensate the system 100 for a varying sensitivity of the sensor 105 and/or the DC offset errors and/or biases present in the velocity signal $S_{VEL}$ and the acceleration signal $S_{ACC}$, the system 100 may comprise a signal generator (not shown). The signal generator may be configured to apply one or more input signals to the actuator 115, via the actuator control circuit 120, when the system 100 is performing the exemplary calibration scheme. For example, the signal generator may be configured to apply a third input signal $S_{IN3}$ and a fourth input signal $S_{IN4}$ to the actuator 115, via the actuator control circuit 120, when the system 100 is calibrating the drive signal $S_{DR}$.

Each input signal may control movement of the x- and/or y-axis of the actuator 115. Accordingly, the signal generator may be configured to apply a third x-axis input signal $S_{IN3\_X}$ and a third y-axis input signal $S_{IN3\_Y}$ to the actuator 115, via the actuator control circuit 120. The signal generator may be further configured to apply a fourth x-axis input signal $S_{IN4\_X}$ and a fourth y-axis input signal $S_{IN4\_Y}$ to the actuator 115 via the actuator control circuit 120.

The system 100 may further comprise a vibrator 166 (e.g., as illustrated in FIGS. 8A-8C). The vibrator 166 may be configured to apply one or more vibrator signals to the electronic device. For example, the vibrator 166 may apply a first vibrator signal, a second vibrator signal, and a third vibrator signal to the electronic device. The first vibrator signal may be applied to the electronic device in a y-axis direction; the second vibrator signal may be applied to the electronic device in an x-axis direction; and the third vibrator signal may be applied to the electronic device in a z-axis direction.

The vibrator 166 may apply the one or more vibrator signals to the electronic device in any suitable manner. For example, the electronic device may be attached to the vibrator 166, and the vibrator 166 may be operated such that the vibrator 166 rotates the electronic device in an x-, y-, and/or z-axis direction.

In response to applying the first and second vibrator signals to the electronic device, the sensor 105 may generate and transmit a fifth x-axis input signal $S_{IN5\_X}$ and a fifth y-axis input signal $S_{IN5\_Y}$ to the actuator 115, via the actuator control circuit 120, respectively. Similarly, and in response to applying the third vibrator signal to the electronic device, the sensor 105 may generate and transmit a sixth x-axis input signal $S_{IN6\_X}$ and a sixth y-axis input signal $S_{IN6\_Y}$ to the actuator 115, via the actuator control circuit 120, respectively.

When the system 100 is performing the exemplary calibration scheme, the input signals $S_{IN3\_X}$, $S_{IN3\_Y}$-$S_{IN6\_X}$, $S_{IN6\_Y}$ may be applied to the actuator 115, via the actuator control circuit 120, while the electronic device may be positioned in one or more different positions. Accordingly, various components of the system 100, including various sub-components of the actuator control circuit 120, may be disabled.

In response to positioning the electronic device in the one or more different positions, various components of the system 100, including the various sub-components of the actuator control circuit 120, such as sub-circuits 160a, 160b, 165a, 165b, 170a, 170b, 175a, 175b may generate their respective output signals $S_{OUT1\_X}$, $S_{OUT1\_Y}$-$S_{OUT4\_X}$, $S_{OUT4\_Y}$.

The x-axis input signals $S_{N3\_X}$, $ST_{N4\_X}$ and/or the fourth x-axis output signal $S_{OUT4\_X}$, which may be generated by the first inertial force cancellation circuit 175a in response to moving the electronic device, may be transmitted to one or more circuit components for further processing before ultimately being transmitted to the actuator 115 via the first driver circuit 180a. Similarly, the y-axis input signals $S_{IN3\_Y}$, $S_{IN4\_Y}$ and/or the fourth y-axis output signal $S_{OUT4\_Y}$, which may be generated by the second inertial force cancellation circuit 175b in response to moving the electronic device, may be transmitted to one or more circuit components for further processing before ultimately being transmitted to the actuator 115 via the second driver circuit 180b.

When the drive signals $S_{DR\_X}$, $S_{DR\_Y}$, which may be current signals, are applied to the actuator 115, the magnetic flux density B of the magnet 185 may vary (i.e., change over time). As a result, the coil 152 and the magnet 152 may induce (i.e., generate) a varying voltage. The induced voltage may then be used by the actuator 115, which may be configured as a voice coil motor (VCM), to generate a thrust force to position a moving body, such as the lens 142.

Accordingly, applying the third input signal $S_{IN3}$ to the actuator 115, via the actuator control circuit 120, may cause a first displacement $\Delta d_1$ of the lens 142, such that the lens displaces to coordinates $(X_1, Y_1, Z_0)$. Coordinates $(X_1, Y_1, Z_0)$ may be defined with respect to a reference position $(X_0, Y_0, Z_0)$. The first displacement $\Delta d_1$ may comprise a first x-axis displacement $\Delta d_{1\_X}$ and a first y-axis displacement $\Delta d_{1\_Y}$.

Applying the fourth input signal $S_{IN4}$ to the actuator 115, via the actuator control circuit 120, may cause a second displacement $\Delta d_2$ of the lens 142, such that the lens 142 displaces to coordinates $(X_2, Y_2, Z_0)$. The second displacement $\Delta d_2$ may comprise a second x-axis displacement $\Delta d_{2\_X}$ and a second y-axis displacement $\Delta d_{2\_Y}$.

Applying the fourth input signal $S_{IN4}$ to the actuator control circuit 120 while moving the electronic device may cause a third displacement $\Delta d_3$ of the lens 142, such that the lens displaces to coordinates $(X_3, Y_3, Z_0)$. The third displacement $\Delta d_3$ may comprise a third x-axis displacement $\Delta d_{3\_X}$ and a third y-axis displacement $\Delta d_{3\_Y}$.

The sensor 105 may generate and transmit the fifth input signals $S_{IN5\_X}$, $S_{IN5\_Y}$ to the actuator control circuit 120 in response to applying the first and second vibrator signals, respectively, to the electronic device. Accordingly, applying the first and second vibrator signals to the electronic device may cause a fourth displacement $\Delta d_4$ of the lens 142, such that the lens 142 displaces to coordinates $(X_4, Y_4, Z_0)$. The fourth displacement $\Delta d_4$ may comprise a fourth x-axis displacement $\Delta d_{4\_X}$ and a fourth y-axis displacement $\Delta d_{4\_Y}$.

Similarly, the sensor 105 may generate and transmit the sixth input signals $S_{IN6\_X}$, $S_{IN6\_Y}$ to the actuator control circuit 120 in response to applying the third vibrator signal to the electronic device. Accordingly, applying the third vibrator signal to the electronic device may cause a fifth displacement $\Delta d_5$ of the lens 142, such that the lens 142 displaces to coordinates $(X_5, Y_5, Z_0)$. The fifth displacement $\Delta d_5$ may comprise a fifth x-axis displacement $\Delta d_{5\_X}$ and a fifth y-axis displacement $\Delta d_{5\_Y}$.

The actuator control circuit 120 may further comprise a calculation circuit (not shown) configured to produce the correction gains $A_{1\_X}$-$A_{4\_Y}$, $A_{1\_Y}$-$A_{4\_Y}$. The calculation circuit may be integrated within the actuator control circuit 120, or alternatively, may be formed on a companion circuit that is accessible to the actuator control circuit 120. The calculation circuit (not shown) may be in communication with the amplifiers 200a, 200b-215a, 215b. For example, the calculation circuit may provide the first x-axis correction gain $A_{1\_X}$ to the fourth amplifier 215a and the first y-axis correction gain $A_{1\_Y}$ to the eighth amplifier 215b. The calculation circuit may also provide the second x-axis correction gain $A_{2\_X}$ to the first amplifier 200a and the second y-axis correction gain $A_{2\_Y}$ to the fifth amplifier 200b. The calculation circuit may further provide the third x-axis correction gain $A_{3\_X}$ to the second amplifier 205a and the third y-axis correction gain $A_{3\_Y}$ to the sixth amplifier 205b. Similarly, the calculation circuit may further provide the fourth x-axis correction gain $A_{4\_X}$ to the third amplifier 210a and the fourth y-axis correction gain $A_{4\_Y}$ to the seventh amplifier 210b. In various embodiments, the calculation circuit may comprise any circuit and/or system suitable for performing various calculations, such as division, multiplication, and the like. For example, the calculation circuit may comprise a system of logic circuits or a field programmable gate array circuit.

The calculation circuit may be configured to compute a first x-axis difference value $\Delta_{1\_X}$ between the magnitude of the third x-axis input signal $S_{IN3\_X}$ and the magnitude of the fourth x-axis input signal $S_{IN4\_X}$ and a first y-axis difference value $\Delta_{1\_Y}$ between the magnitude of the third y-axis input signal $S_{IN3\_Y}$ and the magnitude of the fourth y-axis input signal $S_{IN4\_Y}$. The calculation circuit may also be configured to compute a second x-axis difference value $\Delta_{2\_X}$ between the first x-axis displacement $\Delta d_{1\_X}$ and the second x-axis displacement $\Delta d_{2\_X}$ and a second y-axis difference value $\Delta_{2\_Y}$ between the first y-axis displacement $\Delta d_{1\_Y}$ and the second y-axis displacement $\Delta d_{2\_Y}$. The calculation circuit may be further configured to compute a third x-axis difference value $\Delta_{3\_X}$ between the second x-axis displacement $\Delta d_{2\_X}$ and the third x-axis displacement $\Delta d_{3\_X}$ and a third y-axis difference value $\Delta_{3\_Y}$ between the second y-axis displacement $\Delta d_{2\_Y}$ and the third y-axis displacement $\Delta d_{3\_Y}$.

The calculation circuit may be further configured to compute a fourth x-axis difference value $\Delta_{4\_X}$ between the magnitude of a fourth x-axis output signal $S_{OUT4\_X(1)}$ and the magnitude of a fourth x-axis output signal $S_{OUT4\_X(2)}$. The fourth x-axis output signal $S_{OUT4\_X(1)}$ may be generated by the first inertial force cancellation circuit 175a in response to positioning the electronic device in a first position and the fourth x-axis output signal $S_{OUT4\_X(2)}$ may be generated by the first inertial force cancellation circuit 175a in response to positioning the electronic device in a second position. It will be appreciated that the fourth x-axis output signal $S_{OUT4\_X(1)}$ may be different than the fourth x-axis output signal $S_{OUT4\_X(2)}$.

Similarly, the calculation circuit may be further configured to compute a fourth y-axis difference value $\Delta_{4\_Y}$ between the magnitude of a fourth y-axis output signal $S_{OUT4\_Y(1)}$ and the magnitude of a fourth y-axis output signal $S_{OUT4\_Y(2)}$. The fourth y-axis output signal $S_{OUT4\_Y(1)}$ may be generated by the second inertial force cancellation circuit 175b in response to positioning the electronic device in the first position, and the fourth y-axis output signal $S_{OUT4\_Y(2)}$ may be generated by the second inertial force cancellation circuit 175b in response to positioning the electronic device in the second position. It will be appreciated that the fourth y-axis output signal $S_{OUT4\_Y(1)}$ may be different than the fourth y-axis output signal $S_{OUT4\_Y(2)}$.

The calculation circuit may be further configured to compute the first x- and y-axis correction gains $A_{1\_X}$, $A_{1\_Y}$ according to the difference values $\Delta_1$, $\Delta_2$, $\Delta_3$, $\Delta_4$. For example, the calculation circuit may be configured to compute a first ratio and a second ratio, where the first ratio may be equal to the first difference value $\Delta_1$ divided by the second difference value $\Delta_2$, and the second ratio may be equal to the third difference value $\Delta_3$ divided by the fourth difference value $\Delta_4$. In an exemplary embodiment, the first x-axis correction gain $A_{1\_X}$ may be described by the following equation:

$$A_{1\_X} = \frac{S_{IN4\_X} - S_{IN3\_X}}{X_2 - X_1} * \frac{X_3 - X_2}{S_{OUT4\_X(2)} - S_{OUT4\_X(1)}}$$

Similarly, the first y-axis correction gain $A_{1\_Y}$ may be described by the following equation:

$$A_{1\_Y} = \frac{S_{IN4\_Y} - S_{IN3\_Y}}{Y_2 - Y_1} * \frac{Y_3 - Y_2}{S_{OUT4\_Y(2)} - S_{OUT4\_Y(1)}}$$

The calculation circuit may be further configured to compute the second x- and y-axis correction gains $A_{2\_X}$, $A_{2\_Y}$ according to the first ratio, the fourth displacement $\Delta d_4$, and the third x- and y-axis output signals $S_{OUT3\_X}$, $S_{OUT3\_Y}$. For example, the calculation circuit may be configured to compute a third ratio, where the third ratio is equal to the fourth displacement $\Delta d_4$ divided by the amplitude of the first x-axis output signal $S_{OUT1\_X(1)}$ and the first y-axis output signal $S_{OUT1\_Y(1)}$. The first x-axis output signal $S_{OUT1\_X(1)}$ may be generated by the first centripetal force correction circuit 160a in response to receiving the fifth x-axis input signal $S_{IN5\_X}$ from the sensor 105. Similarly, the first y-axis output signal $S_{OUT1\_Y(1)}$ may be generated by the third centripetal force correction circuit 160b in response to receiving the fifth y-axis input signal $S_{IN5\_Y}$ from the sensor 105.

In an exemplary embodiment, the second x-axis correction gain $A_{2\_X}$ may be described by the following equation:

$$A_{2\_X} = \frac{S_{IN4\_X} - S_{IN3\_X}}{X_2 - X_1} * \frac{X_4 - X_0}{S_{OUT1\_X(1)}}$$

It will be appreciated that $X_4$-$X_0$ may be an amplitude of the x-coordinate associated with the lens position.

Similarly, the second y-axis correction gain $A_{2\_Y}$ may be described by the following equation:

$$A_{2\_Y} = \frac{S_{IN4\_Y} - S_{IN3\_Y}}{Y_2 - Y_1} * \frac{Y_4 - Y_0}{S_{OUT1\_Y(1)}}$$

It will be appreciated that $Y_4$-$Y_0$ may be an amplitude of the y-coordinate associated with the lens position.

In an exemplary embodiment, the third x-axis correction gain $A_{3\_X}$ may be described by the following equation:

$$A_{3\_X} = A_{2\_X}$$

Similarly, the third y-axis correction gain $A_{3\_Y}$ may be described by the following equation:

$$A_{3\_Y} = A_{2\_Y}$$

The calculation circuit may be further configured to compute the fourth x- and y-axis correction gains $A_{4\_X}$, $A_{4\_Y}$ according to the second ratio, the fifth displacement $\Delta d_5$, and the amplitude of the third x- and y-axis output signals $S_{OUT3\_X}$, $S_{OUT3\_Y}$. For example, the calculation circuit may be configured to compute a fourth ratio, where the fourth ratio is equal to the fifth displacement $\Delta d_5$ divided by the amplitude of a third x-axis output signal $S_{OUT3\_X(1)}$ and a third y-axis output signal $S_{OUT3\_Y(1)}$. The third x-axis output signal $S_{OUT3\_X(1)}$ may be generated by the first tangential acceleration correction circuit 170a in response to receiving the sixth x-axis input signal $S_{IN6\_X}$ from the sensor 105. Similarly, the third y-axis output signal $S_{OUT3\_Y(1)}$ may be generated by the second tangential acceleration correction circuit 170b in response to receiving the sixth y-axis input signal $S_{IN6\_Y}$ from the sensor 105.

In an exemplary embodiment, the fourth x-axis correction gain $A_{4\_X}$ may be described by the following equation:

$$A_{4\_X} = \frac{S_{IN4\_X} - S_{IN3\_X}}{X_2 - X_1} * \frac{X_5 - X_0}{S_{OUT3\_X(1)}}$$

It will be appreciated that $X_5$-$X_0$ may be an amplitude of the x-coordinate associated with the lens position.

Similarly, the fourth y-axis correction gain $A_{4\_Y}$ may be described by the following equation:

$$A_{4\_Y} = \frac{S_{IN4\_Y} - S_{IN3\_Y}}{Y_2 - Y_1} * \frac{Y_5 - Y_0}{S_{OUT3\_Y(1)}}$$

It will be appreciated that $Y_5$-$Y_0$ may be an amplitude of the y-coordinate associated with the lens position.

In operation, generating the drive signal $S_DR$ may comprise receiving the first and second input signals $S_{IN1}$, $S_{IN2}$ from the sensor 105. Generating the drive signal $S_{DR}$ may further comprise performing: a first calibration 320; a second calibration 340; a third calibration 360; and a fourth calibration 380.

Performing the first calibration 320 may comprise generating a first offset-corrected signal according to the first input signal $S_{IN1}$. Performing the first calibration 320 may further comprise generating a second offset-corrected signal according to the second input signal $S_{IN2}$. Performing the second calibration 340 may comprise determining the first x- and y-axis correction gains $A_{1\_X}$, $A_{1\_Y}$. Performing the third calibration 360 may comprise determining the second x- and y-axis correction gains $A_{2\_X}$, $A_{2\_Y}$, and performing the fourth calibration 380 may comprise determining the third x- and y-axis correction gains $A_{3\_X}$, $A_{3\_Y}$ and the fourth x- and y-axis correction gains $A_{4\_X}$, $A_{4\_Y}$.

Generating the drive signal $S_DR$ may further comprise generating the first drive signal $S_{DR\_X}$ and the second drive signal $S_{DR\_Y}$. Generating the first drive signal $S_{DR\_X}$ may comprise: generating the first corrected x-axis output signal $S_{OUT1\_CORR\_X}$ by applying the second x-axis correction gain $A_{2\_X}$ to the first x-axis output signal $S_{OUT1\_X}$; generating the second corrected x-axis output signal $S_{OUT2\_CORR\_X}$ by applying the third x-axis correction gain $A_{3\_X}$ to the second x-axis output signal $S_{OUT2\_X}$; and generating the third corrected x-axis output signal $S_{OUT3\_CORR\_X}$ by applying the fourth x-axis correction gain $A_{4\_X}$ to the third x-axis output signal $S_{OUT3\_X}$. Generating the first drive signal $S_{DR\_X}$ may further comprise generating the fourth x-axis output signal $S_{OUT4\_X}$ according to the corrected x-axis output signals $S_{OUT1\_CORR\_X}$, $S_{OUT2\_CORR\_X}$, $S_{OUT3\_CORR\_X}$, via the first inertial force cancellation circuit 175a, and applying the first x-axis correction gain $A_{1\_X}$ to the fourth x-axis output signal $S_{OUT4\_X}$.

Similarly, generating the second drive signal $S_{DR\_Y}$ may comprise: generating the first corrected y-axis output signal $S_{OUT1\_CORR\_Y}$ by applying the second y-axis correction gain $A_{2\_Y}$ to the first y-axis output signal $S_{OUT1\_Y}$; generating the second corrected y-axis output signal $S_{OUT2\_CORR\_Y}$ by applying the third y-axis correction gain $A_{3\_Y}$ to the second y-axis output signal $S_{OUT2\_Y}$; and generating the third corrected y-axis output signal $S_{OUT3\_CORR\_Y}$ by applying the fourth y-axis correction gain $A_{4\_Y}$ to the third y-axis output signal $S_{OUT3\_Y}$. Generating the second drive signal $S_{DR\_Y}$ may further comprise generating the fourth y-axis output signal $S_{OUT4\_Y}$ according to the corrected y-axis output signals $S_{OUT1\_CORR\_Y}$, $S_{OUT2\_CORR\_Y}$, $S_{OUT3\_CORR\_Y}$, via the second inertial force cancellation circuit 175b, and applying the first y-axis correction gain $A_{1\_Y}$ to the fourth y-axis output signal $S_{OUT4\_Y}$.

Figure 3:
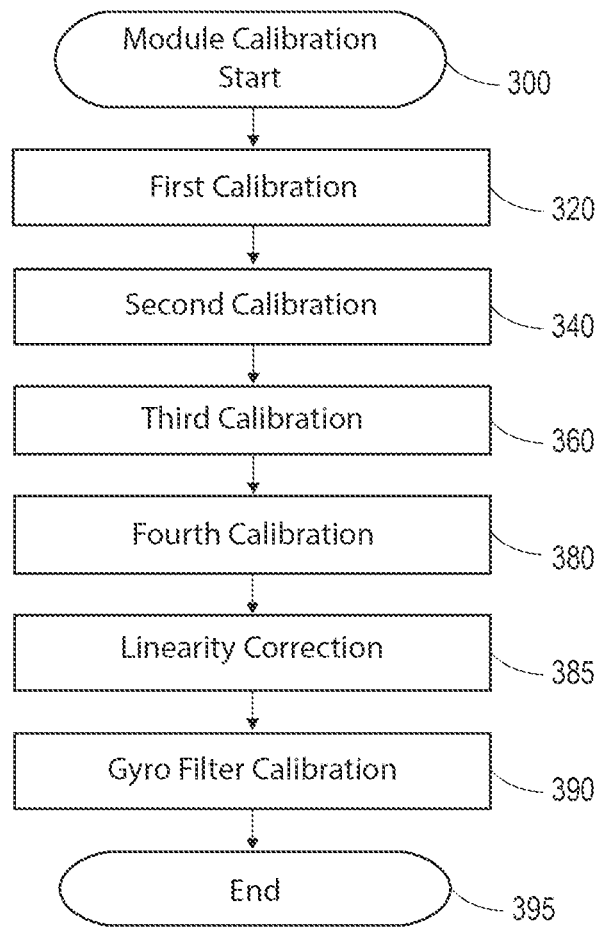
FIG. 3 representatively illustrates a flow diagram for operating the actuator control circuit in accordance with an exemplary embodiment of the present technology.
Figure 4:
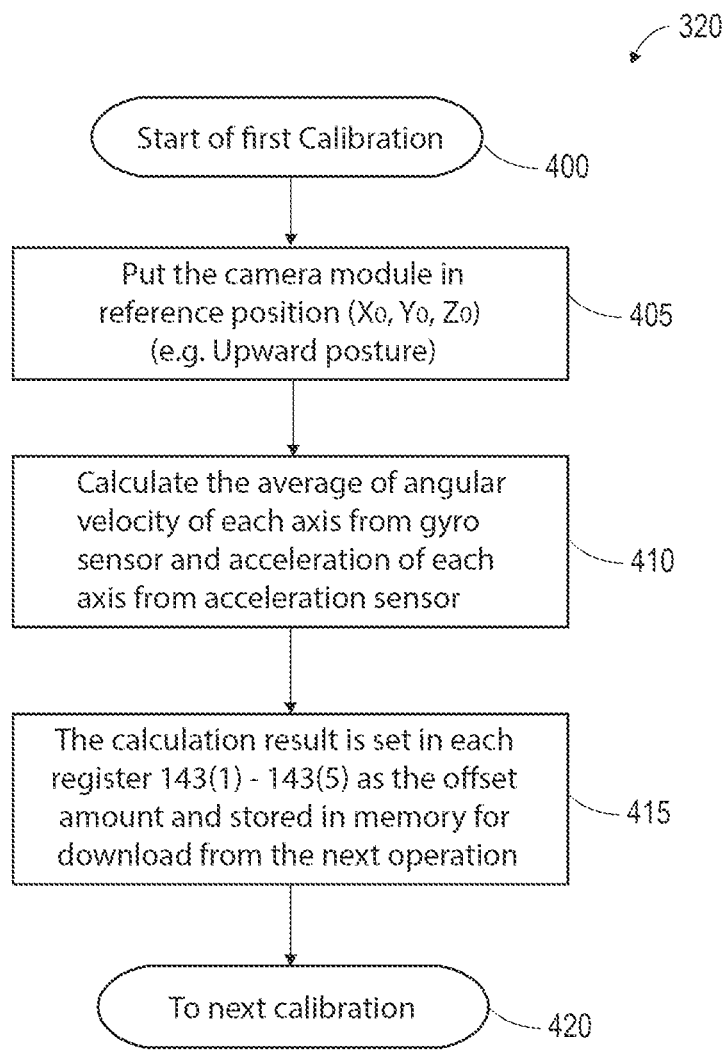
FIG. 4 representatively illustrates a flow diagram for performing a first calibration in accordance with an exemplary embodiment of the present technology.

Referring now to FIGS. 3-7, at the start of the module calibration process (300) (e.g., as illustrated in FIG. 3), a signal, such as the disturbance signal 128, may be applied to the system 100 in an x, y-, and/or z-axis direction. The sensor 105 may detect the disturbance signal 128 and generate a signal from the detected disturbance signal 128. The signal may comprise the first input signal $S_{IN1}$ corresponding to an angular velocity of the device (i.e., the velocity signal $S_{VEL}$) and/or the second input signal $S_{EV2}$ corresponding to an acceleration of the device (i.e., the acceleration signal $S_{ACC}$). The sensor 105 may then transmit the velocity signal $S_{VEL}$ and/or the acceleration signal $S_{ACC}$ to the actuator control circuit 120 for processing. The velocity signal $S_{VEL}$ may comprise first x-, y-, and z-components, and the acceleration signal $S_{ACC}$ may comprise second x- and y-components. After the acceleration signal $S_{ACC}$ and the velocity signal $S_{VEL}$ are received from the sensor 105, each component of the acceleration signal $S_{ACC}$ and the velocity signal $S_{VEL}$ may comprise a DC offset error and/or bias.

At this time, the system 100 may begin performing the first calibration 320 to correct for the DC offset errors and/or biases present in each component of the velocity signal $S_{VEL}$ and/or the acceleration signal $S_{ACC}$. Referring now to FIG.

4, and after the start (400) of the first calibration 320, performing the first calibration 320 may comprise positioning the electronic device in the reference position ($X_0$, $Y_0$, $Z_0$) (405). The reference position may be defined in the context of the x-y-z coordinate system, and the electronic device may be positioned such that it is positioned in an "upright" manner.

Once the electronic device is positioned in the "upright" manner, performing the first calibration 320 may further comprise computing a plurality of average values, where each value is an average of a respective one of the components of the acceleration signal $S_{ACC}$ and/or the velocity signal $S_{VEL}$ (410). For example, three average values may be computed for the acceleration signal $S_{ACC}$ (i.e., one for each of the x-, y-, and z-components), and two average values may be computed for the velocity signal $S_{VEL}$ (i.e., one for each of the x- and y-components). In the case where each component of the acceleration signal $S_{ACC}$ and the velocity signal $S_{VEL}$ is represented by a periodic waveform (e.g., sine wave), the average value of each component may be computed by averaging all of the instantaneous values over one half of a cycle.

After the average values are computed, performing the first calibration 320 may further comprise storing each of the computed average values in a respective one of the plurality of registers 143(1)~143(5) (415). Each register 143 may store one computed average value. For example, in this case where the velocity signal $S_{VEL}$ has x-, y-, and z-components (i.e., three components) and the acceleration signal $S_{ACC}$ has x- and y-components (i.e., two components), there is a total of five average values. Accordingly, a total of five registers 143(1)~143(5) may be used to store the five average values.

To correct for the DC offset errors and/or biases according to certain embodiments, it is desired that a DC offset error and/or bias of zero be sustained. Accordingly, the first circuit portion 121 may generate the offset-corrected acceleration signal $S_{ACC\_CORR}$ by subtracting a signal equal in magnitude to the noise signal from each of the x- and y-components of the acceleration signal $S_{ACC}$. Similarly, the first circuit portion 121 may generate the offset-corrected velocity signal $S_{VEL\_CORR}$ by subtracting a signal equal in magnitude to the noise signal from each of the x-, y-, and z-components of the velocity signal $S_{VEL}$.

The magnitude of each DC offset error and/or bias may be determined in any suitable manner. For example, each computed average value may be compared with the peak amplitude of its respective component. The difference between the computed average value and the peak amplitude may represent the DC offset error and/or bias.

Figure 5:
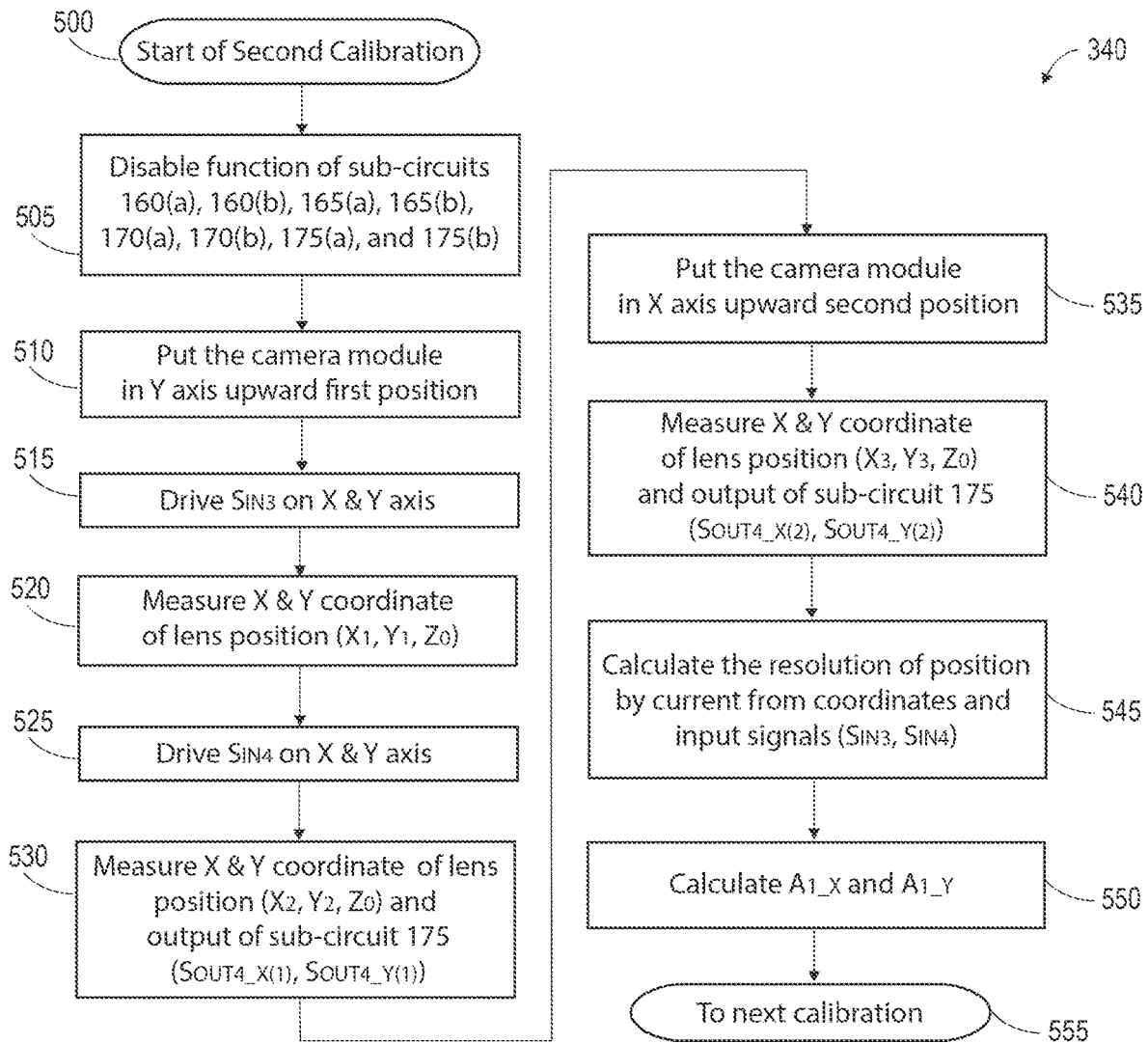
FIG. 5 representatively illustrates a flow diagram for performing a second calibration in accordance with an exemplary embodiment of the present technology.

At this time, the system 100 may stop (420) performing the first calibration 320 and start (500) performing the second calibration 340 (e.g., as illustrated in FIG. 5). After the start (500) of the second calibration 340, and referring now to FIG. 5, performing the second calibration 340 may comprise disabling various sub-components of the actuator control circuit 120 (505). For example, the processor 110 may issue a variety of commands to the actuator control circuit 120 and may instruct the actuator control circuit 120 to disable the centripetal force correction circuits 160a, 165a, 160b, 165b, the tangential acceleration correction circuits 170a, 170b, and the inertial force cancellation circuits 175a, 175b.

Once the various sub-components of the actuator control circuit 120 are disabled, performing the second calibration 340 may further comprise positioning the electronic device in a first position (510). The first position may be different than the reference position. In addition, the electronic device may be positioned such that its y-axis direction is facing "upward". The electronic device may be positioned in the first position in any suitable manner. For example, a user of the system 100 may manually position the electronic device in the first position. In some embodiments, the first position may be predefined. In other embodiments, the first position may be determined according to calibration instructions provided by the manufacturer.

After positioning the electronic device in the first position (510), performing the second calibration 340 may further comprise applying a first calibration signal, such as the third input signal $S_{IN3}$, to the actuator 115 via the actuator control circuit 120 (515). The third input signal $S_{IN\_3}$ may comprise the third x-axis input signal $S_{IN3\_X}$ and the third y-axis input signal $S_{IN3\_Y}$. The third input signal $S_{IN\_3}$ may be any suitable signal, such as a current signal, a voltage signal, and the like. The third input signal $S_{IN\_3}$ may be determined according to certain characteristics of the particular module being calibrated and may be provided by the manufacturer.

The third x- and y-axis input signals $S_{IN3\_X}$, $S_{IN3\_Y}$ may be applied to the x-axis and the y-axis of the actuator 115, respectively. Accordingly, the coil 152 and the magnet 152 may induce (i.e., generate) a varying voltage on the x-axis and the y-axis of the actuator 115. In the case where the actuator 115 is configured as a voice coil motor (VCM), the induced voltages may then be used by the actuator 115 to generate a thrust force to position a moving body, such as the lens 142, in the x- and y-axis directions. Accordingly, applying the third input signal $S_{IN\_3}$ to the actuator control circuit 120 may cause a displacement of the lens 142, such as the first displacement $\Delta d_1$, in the x-axis direction and the y-axis direction. At this time, the lens 142 may be located at coordinates ($X_1$, $Y_1$, $Z_0$), where coordinates ($X_1$, $Y_1$, $Z_0$) are defined with respect to the reference position ($X_0$, $Y_0$, $Z_0$).

Accordingly, after the third input signal $S_{IN3}$ is applied to the actuator control circuit 120, performing the second calibration 340 may further comprise determining the first displacement $\Delta d_1$ of the lens 142 (520). The first displacement $\Delta d_1$ may comprise the first x-axis displacement $\Delta d_{1\_X}$ and the first y-axis displacement $\Delta d_{1\_Y}$. The first x-axis displacement $\Delta d_{1\_X}$ may be described by the following equation:

$$\Delta d_{1\_X} = X_1 - X_0$$

Similarly, the first y-axis displacement $\Delta d_{1\_Y}$ may be described by the following equation:

$$\Delta d_{1\_Y} = Y_1 - Y_0$$

It will be appreciated that the first displacement $\Delta d_1$ may be determined in any suitable manner. For example, a camera may be used to capture a first photograph of the electronic device in the reference position and a second photograph of the electronic device in the first position. The first and second photographs may then be analyzed by a computer or any other suitable computation circuit to determine the first displacement $\Delta d_1$. Alternatively, the user of the system 100 may determine the first displacement $\Delta d_1$ by manually measuring the first displacement $\Delta d_1$.

After the first displacement $\Delta d_1$ is determined, performing the second calibration 340 may further comprise applying a second calibration signal, such as the fourth input signal $S_{IN\_4}$, to the actuator 115 via the actuator control circuit 120 (525). The fourth input signal $S_{IN\_4}$ may comprise the fourth x-axis input signal $S_{IN4\_X}$ and the fourth y-axis input signal $S_{IN4\_Y}$. The fourth input signal $S_{IN\_4}$ may be any suitable signal, such as a current signal, a voltage signal, and the like. The fourth input signal $S_{IN\_4}$ may be determined according to certain characteristics of the particular module being calibrated and may be provided by the manufacturer.

Accordingly, applying the fourth input signal $S_{IN\_4}$ to the actuator 115, via the actuator control circuit 120, may cause a displacement of the lens 142, such as the second displacement $\Delta d_2$, in the x-axis direction and the y-axis direction. At this time, the lens 142 may be located at coordinates $(X_2, Y_2, Z_0)$, where coordinates $(X_2, Y_2, Z_0)$ are defined with respect to the reference position $(X_0, Y_0, Z_0)$.

After the fourth input signal $S_{IN\_4}$ is applied to the actuator 115, via the actuator control circuit 120, performing the second calibration 340 may further comprise determining the second displacement $\Delta d_2$ of the lens 142 (530). The second displacement $\Delta d_2$ may comprise the second x-axis displacement $\Delta d_{2\_X}$ and the second y-axis displacement $\Delta d_{2\_Y}$. The second x-axis displacement $\Delta d_{2\_X}$ may be described by the following equation:

$$\Delta d_{2\_X} = X_2 - X_0$$

Similarly, the second y-axis displacement $\Delta d_{2\_Y}$ may be described by the following equation:

$$\Delta d_{2\_Y} = Y_2 - Y_0$$

At this time, the fourth x- and y-axis output signals $S_{OUT4\_X(1)}$, $S_{OUT4\_Y(1)}$ may be measured. The fourth x- and y-axis output signals $S_{OUT4\_X(1)}$, $S_{OUT4\_Y(1)}$ may be generated by the first inertial force cancellation circuit 175a and the second inertial force cancellation circuit 175b, respectively, in response to positioning the electronic device in the first position. Each output signal $S_{OUT4\_X(1)}$, $S_{OUT4\_Y(1)}$ may be measured in any suitable manner. For example, the actuator control circuit 120 may comprise measurement circuitry (not shown) capable of measuring the fourth output signals $S_{OUT4\_X(1)}$, $S_{OUT4\_Y(1)}$. The measurement circuitry may also be capable of transmitting, in the form of data, the measured fourth output signals $S_{OUT4\_X(1)}$, $S_{OUT4\_Y(1)}$ to other circuit components, such as the processor 110.

After the second displacement $\Delta d_2$ of the lens 142 is determined and the output signals $S_{OUT4\_X(1)}$, $S_{OUT4\_Y(1)}$ are measured, performing the second calibration 340 may further comprise positioning the electronic device in a second position (535). The second position may be different than the first position and the reference position. In addition, the electronic device may be positioned such that the x-axis direction is facing "upward". The electronic device may be positioned in the second position in any suitable manner. For example, a user of the system 100 may manually position the electronic device in the second position. In some embodiments, the second position may be predefined. In other embodiments, the second position may be determined according to calibration instructions provided by the manufacturer.

Accordingly, positioning the electronic device in the second position may cause a displacement of the lens, such as the third displacement $\Delta d_3$, in the x-axis direction and the y-axis direction. At this time, the lens 142 may be located at coordinates $(X_3, Y_3, Z_0)$, where coordinates $(X_3, Y_3, Z_0)$ are defined with respect to the reference position $(X_0, Y_0, Z_0)$.

Thereafter, performing the second calibration 340 may further comprise determining the third displacement $\Delta d_3$ of the electronic device (540). The third displacement $\Delta d_3$ may comprise a third x-axis displacement $\Delta d_{3\_X}$ and a third y-axis displacement $\Delta d_{3\_Y}$. The third x-axis displacement $\Delta d_{3\_X}$ may be described by the following equation:

$$\Delta d_{3\_X} = X_3 - X_0$$

Similarly, the third y-axis displacement $\Delta d_{3\_Y}$ may be described by the following equation:

$$\Delta d_{3\_Y} = Y_3 - Y_0$$

At this time, the fourth x- and y-axis output signals $S_{OUT4\_X(2)}$ and $S_{OUT4\_Y(2)}$ may be measured. The fourth x- and y-axis output signals $S_{OUT4\_X(2)}$, $S_{OUT4\_Y(2)}$ may be generated by the first inertial force cancellation circuit 175a and the second inertial force cancellation circuit 175b, respectively, in response to positioning the electronic device in the second position. Each output signal $S_{OUT4\_X(2)}$, $S_{OUT4\_Y(2)}$ may be measured in any suitable manner, such as discussed above.

After the third x- and y-axis displacements $\Delta d_{3\_X}$, $\Delta d_{3\_Y}$ are determined and the fourth output signals $S_{OUT4\_X(2)}$ and $S_{OUT4\_Y(2)}$ are measured, performing the second calibration 340 may further comprise computing a first ratio and a second ratio (545). The first ratio may be determined according to the first difference value $\Delta_1$ and the second difference value $\Delta_2$, and the second ratio may be determined according to the third difference value $\Delta_3$ and the fourth difference value $\Delta_4$. The actuator control circuit 120 may compute the first difference value $\Delta_1$ by computing a difference between the amplitude of the third input signal $S_{IN3}$ and the amplitude of the fourth input signal $S_{IN4}$. For example, the first x-axis difference value $\Delta_{1\_X}$ may be described by the following equation:

$$\Delta_{1\_X} = S_{IN4\_X} - S_{IN3\_X}$$

Similarly, the first y-axis difference value $\Delta_{1\_Y}$ may be described by the following equation:

$$\Delta_{1\_Y} = S_{IN4\_Y} - S_{IN3\_Y}$$

It will be appreciated that the magnitude of $A_{1\_X}$ may be equal to the magnitude of $\Delta_{1\_Y}$.

The actuator control circuit 120 may compute the second difference value $\Delta_2$ by computing a difference between the first displacement $\Delta d_1$ and the second displacement $\Delta d_2$. For example, the second x-axis difference value $\Delta_{2\_X}$ may be described by the following equation:

$$\Delta_{2\_X} = \Delta d_{2\_X} - \Delta d_{1\_X}$$

Similarly, the second y-axis difference value $\Delta_{2\_Y}$ may be described by the following equation:

$$\Delta_{2\_Y} = \Delta d_{2\_Y} - \Delta d_{1\_Y}$$

The actuator control circuit 120 may compute the third difference value $\Delta_3$ by computing a difference between the second displacement $\Delta d_2$ and the third displacement $\Delta d_3$. For example, the third x-axis difference value $\Delta_{3\_X}$ may be described by the following equation:

$$\Delta_{3\_X} = \Delta d_{3\_X} - \Delta d_{2\_X}$$

Similarly, the third y-axis difference value $\Delta_{3\_Y}$ may be described by the following equation:

$$\Delta_{3\_Y} = \Delta d_{3\_Y} - \Delta d_{2\_Y}$$

The actuator control circuit 120 may then compute the fourth difference value $\Delta_4$ by computing a difference between the amplitude of the fourth output signals $S_{OUT4\_X(1)}$, $S_{OUT4\_Y(1)}$ and the fourth output signals $S_{OUT4\_X(2)}$, $S_{OUT4\_Y(2)}$. For example, the fourth x-axis difference value $\Delta_{4\_X}$ may be described by the following equation:

$$\Delta_{4\_X} = S_{OUT4\_X(2)} - S_{OUT4\_X(1)}$$

Similarly, the fourth y-axis difference value $\Delta_{4\_Y}$ may be described by the following equation:

$$\Delta_{4\_Y} = S_{OUT4\_Y(2)} - S_{OUT4\_Y(1)}$$

It will be appreciated that the magnitude of $A_{4\_X}$ may be equal to the magnitude of $A_{4\_Y}$.

The actuator control circuit 120 may then compute the first ratio by dividing the first difference value $\Delta_1$ by the second difference value $\Delta_2$. Similarly, the actuator control circuit 120 may compute the second ratio by dividing the third difference value $\Delta_3$ by the fourth difference value $\Delta_4$.

After the first ratio and second ratios are computed, performing the second calibration 340 may further comprise computing the first x- and y-axis correction gains $A_{1\_X}$, $A_{1\_Y}$ according to the first and second ratios (550). In an exemplary embodiment, the first x-axis correction gain $A_{1\_X}$ may be described by the following equation:

$$A_{1\_X} = \frac{\Delta_{1\_X}}{\Delta_{2\_X}} * \frac{\Delta_{3\_X}}{\Delta_{4\_X}}$$

Similarly, the first y-axis correction gain $A_{1\_Y}$ may be described by the following equation:

$$A_{1\_Y} = \frac{\Delta_{1\_Y}}{\Delta_{2\_Y}} * \frac{\Delta_{3\_Y}}{\Delta_{4\_Y}}$$

The first x-axis correction gain $A_{1\_X}$ may be stored in the memory (not shown) and/or transmitted to the fourth amplifier 215a. Similarly, the first y-axis correction gain $A_{1\_Y}$ may be stored in the memory (not shown) and/or transmitted to the eighth amplifier 215b.

Figure 6:
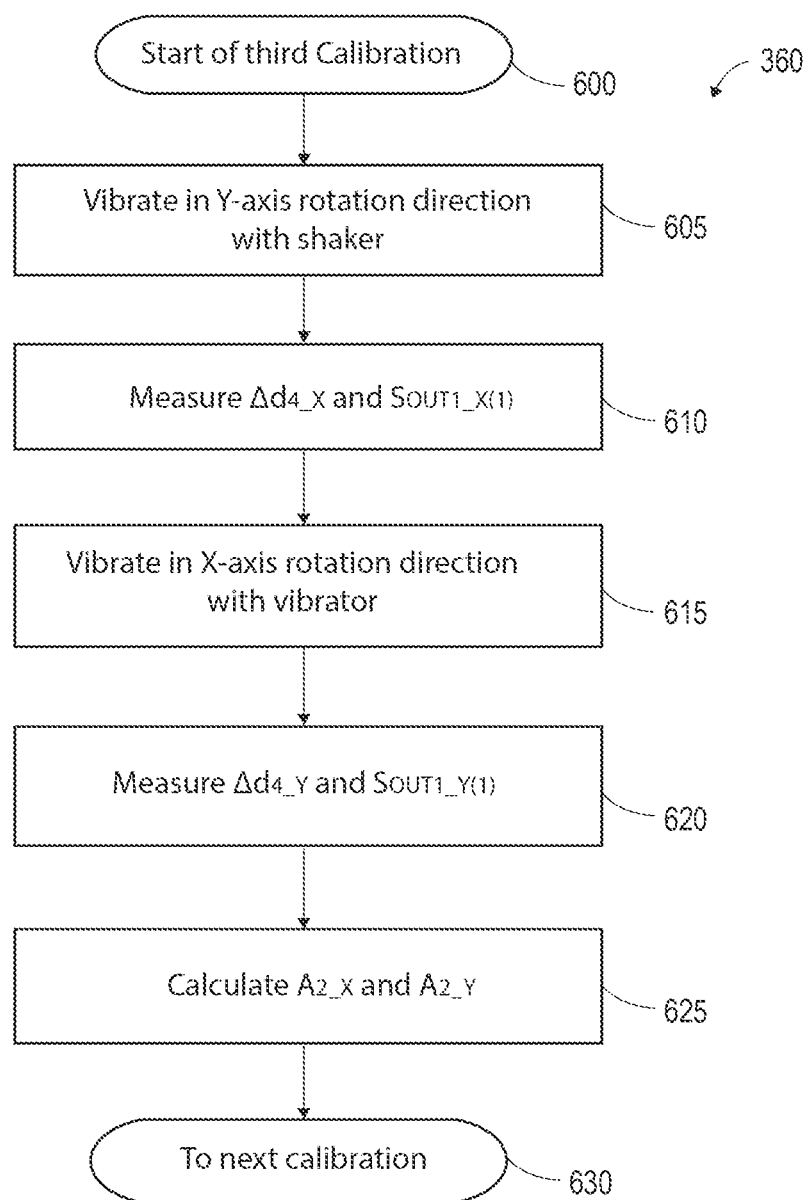
FIG. 6 representatively illustrates a flow diagram for performing a third calibration in accordance with an exemplary embodiment of the present technology.

At this time, the system 100 has completed (555) performing the second calibration 340 and may start (600) performing the third calibration 360 (e.g., as illustrated in FIG. 6).

Referring now to FIGS. 6 and 8A-8C, after the start (600) of the third calibration 360, performing the third calibration 360 may comprise applying the first vibrator signal to the electronic device (605). The first vibrator signal may be applied to the electronic device in any suitable manner. For example, the electronic device may be attached to the vibrator 166, and the vibrator 166 may be operated such that the vibrator 166 rotates the electronic device in a y-axis direction. In response to applying the first vibrator signal to the sensor 105, the sensor 105 may generate a signal, such as the fifth input single $S_{IN5}$. The sensor 105 may then transmit the fifth input signal $S_{IN5}$ to the actuator control circuit 120 for further processing.

Because the vibrator 166 is operated in the y-axis direction, the resulting y-axis centripetal force will cause the lens 142 to displace in the x-axis direction. Accordingly, applying the first vibrator signal to the electronic device may cause a displacement in the x-axis direction, such as the fourth x-axis displacement $\Delta d_{4\_X}$. At this time, the lens 142 may be located at coordinates $(X_4, Y_0, Z_0)$, where coordinates $(X_4, Y_0, Z_0)$ are defined with respect to the reference position $(X_0, Y_0, Z_0)$.

Accordingly, performing the third calibration 360 may further comprise determining the fourth x-axis displacement $\Delta d_{4\_X}$ (610). For example, the fourth x-axis displacement $\Delta d_{4\_X}$ may be described by the following equation:

$$\Delta d_{4\_X} = X_4 - X_0$$

It will be appreciated that the fourth x-axis displacement $\Delta d_{4\_X}$ may be determined in any suitable manner, such as discussed above.

In addition, performing the third calibration 360 may further comprise measuring the first x-axis output signal $S_{OUT1\_X(1)}$. The first x-axis output signal $S_{OUT1\_X(1)}$ may be generated by the first centripetal force correction circuit 160a in response to receiving the fifth x-axis input signal $S_{IN5\_X}$ from the sensor 105. The first x-axis output signal $S_{OUT1\_X(1)}$ may be measured in any suitable manner, such as discussed above.

After the first x-axis output signal $S_{OUT1\_X(1)}$ is measured, performing the third calibration 360 may further comprise applying the second vibrator signal to the electronic device (615). The second vibrator signal may be applied to the electronic device in any suitable manner. For example, the electronic device may be attached to the vibrator 166, and the vibrator 166 may be operated such that the vibrator 166 rotates the electronic device in an x-axis direction. In response to applying the second vibrator signal to the electronic device, the sensor 105 may generate a signal, such as the fifth y-axis input single $S_{IN5\_Y}$. The sensor 105 may then transmit the fifth y-axis input signal $S_{IN5\_Y}$ to the actuator 115 via the actuator control circuit 120.

Because the vibrator 166 is operated in the x-axis direction, the resulting y-axis centripetal force will cause the lens 142 to displace in the y-axis direction. Accordingly, applying the second vibrator signal to the electronic device may cause a displacement in the y-axis direction, such as the fourth y-axis displacement $\Delta d_{4\_Y}$. At this time, the lens 142 may be located at coordinates $(X_4, Y_4, Z_0)$, where coordinates $(X_4, Y_4, Z_0)$ are defined with respect to the reference position $(X_0, Y_0, Z_0)$.

Accordingly, performing the third calibration 360 may further comprise determining the fourth y-axis displacement $\Delta d_{4\_Y}$(620). For example, the fourth y-axis displacement $\Delta d_{4\_Y}$ may be described by the following equation:

$$\Delta d_{4\_Y} = Y_4 - Y_0$$

It will be appreciated that the fourth y-axis displacement $\Delta d_{4\_Y}$ may be determined in any suitable manner, such as discussed above.

In addition, performing the third calibration 360 may further comprise measuring a first y-axis output signal $S_{OUT1\_Y(1)}$. The first y-axis output signal $S_{OUT1\_Y(1)}$ may be generated by the third centripetal force correction circuit 160*b* in response to applying the fifth y-axis input signal $S_{IN5\_Y}$ to the actuator control circuit 120. The first y-axis output signal $S_{OUT1\_Y(1)}$ may be measured in any suitable manner, such as discussed above.

After the first y-axis output signal $S_{OUT1\_Y(1)}$ is measured, performing the third calibration 360 may further comprise computing the second x- and y-axis correction gains $A_{2\_X}$, $A_{2\_Y}$ according to a third ratio (625). The third ratio may be determined according to the fourth displacement $\Delta d_4$ and the amplitude of the measured first output signals $S_{OUT1\_X}$, $S_{OUT1\_Y}$. The actuator control circuit 120 may compute the third ratio by dividing the fourth displacement $\Delta d_4$ by the amplitude of the first x- and y-axis output signals $S_{OUT1\_X}$, $S_{OUT1\_Y}$. The actuator control circuit 120 may then compute the second x- and y-axis correction gains $A_{2\_X}$, $A_{2\_Y}$ according to the first ratio and the third ratio. In an exemplary embodiment, the second x-axis correction gain $A_{2\_X}$ may be described by the following equation:

$$A_{2\_X} = \frac{\Delta_{1\_X}}{\Delta_{2\_X}} * \frac{\Delta d_{4\_X}}{S_{OUT1\_X(1)}}$$

Similarly, the second y-axis correction gain $A_{2\_Y}$ may be described by the following equation:

$$A_{2\_Y} = \frac{\Delta_{1\_Y}}{\Delta_{2\_Y}} * \frac{\Delta d_{4\_Y}}{S_{OUT1\_Y(1)}}$$

The second x-axis correction gain $A_{2\_X}$ may be stored in the memory (not shown) and/or transmitted to the first amplifier 200*a*. Similarly, the second y-axis correction gain $A_{2\_Y}$ may be stored in the memory (not shown) and/or transmitted to the fifth amplifier 200*b*.

Figure 7:
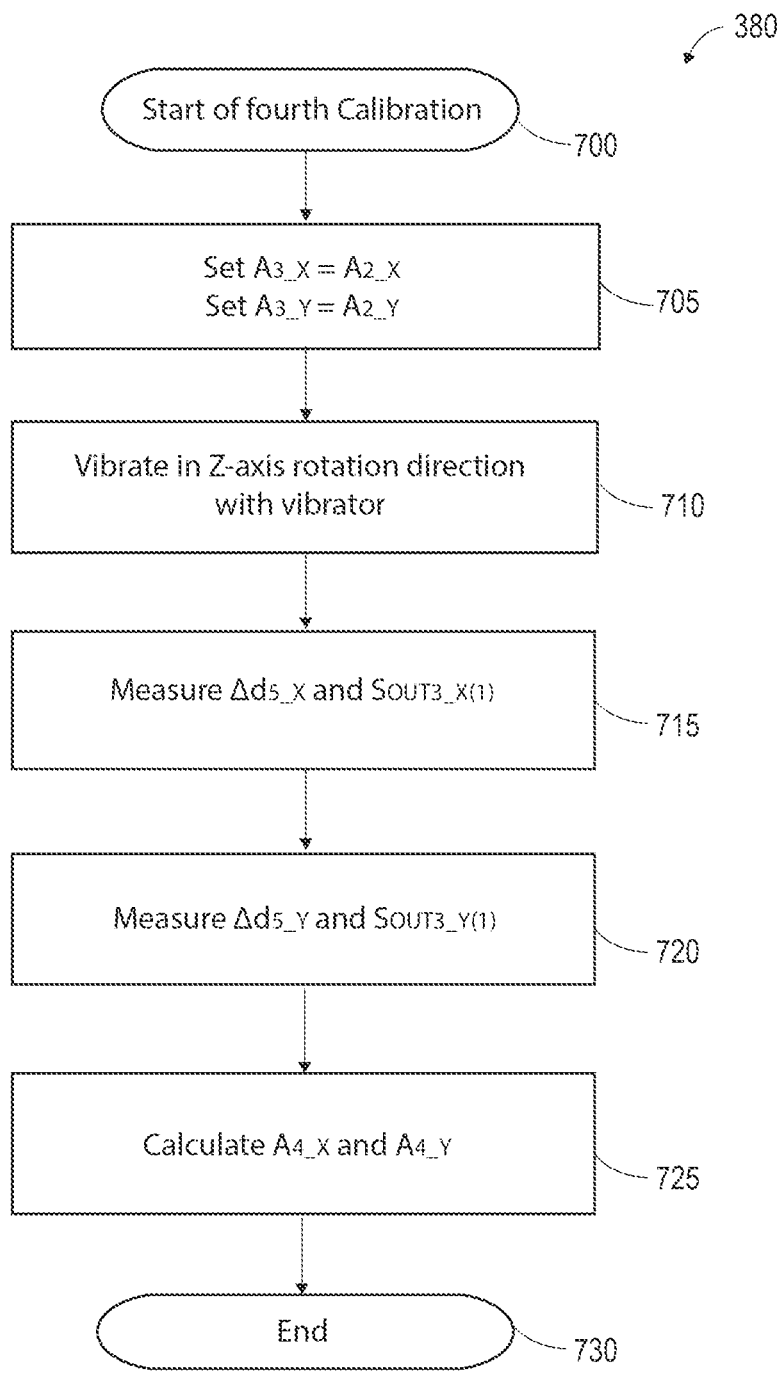
FIG. 7 representatively illustrates a flow diagram for performing a fourth calibration in accordance with an exemplary embodiment of the present technology.

At this time, the system 100 has completed (630) performing the third calibration 360 and may start (700) performing the fourth calibration 380 (e.g., as illustrated in FIG. 7).

Referring now to FIG. 7, after the start (700) of the fourth calibration 380, performing the fourth calibration 380 may comprise determining the third x- and y-axis correction gains $A_{3\_X}$, $A_{3\_Y}$ (705). In an exemplary embodiment, the third x-axis correction gain $A_{3\_X}$ may be described by the following equation:

$$A_{3\_X} = A_{2\_X}$$

Similarly, the third y-axis correction gain $A_{3\_Y}$ may be described by the following equation:

$$A_{3\_Y} = A_{2\_Y}$$

Accordingly, the processor 110 may instruct the actuator control circuit 120 to set the third x-axis correction gain $A_{3\_X}$ equal in magnitude to the computed second x-axis correction gain $A_{2\_X}$. Similarly, the processor 110 may instruct the actuator control circuit 120 to set the third y-axis correction gain $A_{3\_Y}$ equal in magnitude to the computed second y-axis correction gain $A_{2\_Y}$.

The third x-axis correction gain $A_{3\_X}$ may be stored in the memory (not shown) and/or transmitted to the second amplifier 205*a*. Similarly, the third y-axis correction gain $A_{3\_Y}$ may be stored in the memory (not shown) and/or transmitted to the sixth amplifier 205*b*.

After the third x- and y-axis correction gains $A_{3\_X}$, $A_{3\_Y}$ are determined, performing the fourth calibration 380 may further comprise applying the third vibrator signal to the electronic device (710). The third vibrator signal may be applied to the electronic device in any suitable manner. For example, the electronic device may be attached to the vibrator 166, and the vibrator 166 may be operated such that the vibrator 166 rotates the electronic device in a z-axis direction. In response to applying the third vibrator signal to the electronic device, the sensor 105 may generate a signal, such as the sixth input signal $S_{IN6}$. The sensor 105 may then transmit the sixth input signal $S_{IN6}$ to the actuator control circuit 120.

Because the vibrator 166 is operated in the z-axis direction, the resulting z-axis centripetal force will cause the lens 142 to displace in the x- and y-axis directions. Accordingly, applying the third vibrator signal to the electronic device may cause a displacement of the lens 142, such as the fifth displacement $\Delta d_5$, in the x- and y-axis directions. At this time, the lens 142 may be located at coordinates $(X_5, Y_5, Z_0)$, where coordinates $(X_5, Y5, Z_0)$ are defined with respect to the reference position $(X_0, Y_0, Z_0)$.

Accordingly, performing the fourth calibration 380 may further comprise determining the fifth x-axis displacement $\Delta d_{5\_X}$ (715), which may be described by the following equation:

$$\Delta d_{5\_X} = X_5 - X_0$$

It will be appreciated that the fifth x-axis displacement $\Delta d_{5\_X}$ may be determined in any suitable manner, such as discussed above.

In addition, performing the fourth calibration 380 may further comprise measuring a third x-axis output signal $S_{OUT3\_X(1)}$. The third x-axis output signal $S_{OUT3\_X(1)}$ may be generated by the first tangential acceleration correction circuit 170*a* in response to receiving the sixth x-axis input signal $S_{IN6\_X}$ from the sensor 105. The third x-axis output signal $S_{OUT3\_X(1)}$ may be measured in any suitable manner, such as discussed above.

After the fifth x-axis displacement $\Delta d_{5\_X}$ is determined and the third x-axis output signal $S_{OUT3\_X(1)}$ is measured, performing the fourth calibration 380 may further comprise determining the fifth y-axis displacement $\Delta d_{5\_Y}$ (720), which may be described by the following equation:

$$\Delta d_{5\_Y} = Y_5 - Y_0$$

It will be appreciated that the fifth y-axis displacement $\Delta d_{5\_Y}$ may be determined in any suitable manner such as discussed above.

In addition, performing the fourth calibration 380 may further comprise measuring a third y-axis output signal $S_{OUT3\_Y(1)}$. The third y-axis output signal $S_{OUT3\_Y(1)}$ may be generated by the second tangential acceleration correction circuit 170b in response to receiving the sixth y-axis input signal $S_{IN6\_Y}$ from the sensor 105. The third y-axis output signal $S_{OUT3\_Y(1)}$ may be measured in any suitable manner, such as discussed above.

After the fifth y-axis displacement $\Delta d_{5\_Y}$ is determined and the third y-axis output signal $S_{OUT3\_Y(1)}$ is measured, performing the fourth calibration 380 may further comprise computing the fourth x- and y-axis correction gains $A_{4\_X}$, $A_{4\_Y}$ according to a fourth ratio (725). The fourth ratio may be determined according to the fifth displacement $\Delta d_5$ and the amplitude of the measured third x- and y-axis output signals $S_{OUT3\_X}$, $S_{OUT3\_Y}$. The actuator control circuit 120 may compute the fourth ratio by dividing the fourth displacement $\Delta d_4$ by the amplitude of the third x- and y-axis output signals $S_{OUT3\_X}$, $S_{OUT3\_Y}$. The actuator control circuit 120 may then compute the fourth correction gain according to the second ratio and the fourth ratio. In an exemplary embodiment, the fourth x-axis correction gain $A_{4\_X}$ may be described by the following equation:

$$A_{4\_X} = \frac{\Delta_{3\_X}}{\Delta_{4\_X}} * \frac{\Delta d_{5\_X}}{S_{OUT3\_X(1)}}$$

Similarly, the fourth y-axis correction gain $A_{4\_Y}$ may be described by the following equation:

$$A_{4\_Y} = \frac{\Delta_{3\_Y}}{\Delta_{4\_Y}} * \frac{\Delta d_{5\_Y}}{S_{OUT3\_Y(1)}}$$

The fourth x-axis correction gain $A_{4\_X}$ may be stored in the memory (not shown) and/or transmitted to the third amplifier 210a. Similarly, the fourth y-axis correction gain $A_{4\_Y}$ may be stored in the memory (not shown) and/or transmitted to the seventh amplifier 210b.

After the fourth correction gains $A_{4\_X}$, $A_{4\_Y}$ are computed, the system 100 has completed (730) performing the fourth calibration 380 and may begin performing a linearity correction scheme 385.

The system 100 may begin performing any suitable calibration scheme to compensate for any non-linearity present in the sensor 105, such as by using a line of best fit. An ideal system may have perfect linearity, meaning that the magnitude of the drive signal $S_{DR}$ generated by the actuator control circuit 120 is proportional to the velocity signal $S_{VEL}$ generated by the sensor 105.

The first linearity correction circuit 157a may be configured to generate a first linear corrected output signal $S_{OUT\_LC\_X}$ according to the first gyro filter output signal $S_{GF\_OUT\_X}$. For example, the first linearity correction circuit 157a may apply a gain to the first gyro filter output signal $S_{GF\_OUT\_X}$ received from the first gyro filter 155a. Similarly, the second linearity correction circuit 157b may be configured to generate a second linear corrected output signal $S_{OUT\_LC\_Y}$ according to the second gyro filter output signal $S_{GF\_OUT\_Y}$. For example, the second linearity correction circuit 157b may apply a gain to the second gyro filter output signal $S_{GF\_OUT\_Y}$ received from the second gyro filter 155b.

After performing the linearity correction scheme 385, the system 100 may begin performing a gyro filter calibration scheme 390. Performing the gyro filter calibration scheme 390 may comprise preforming any suitable calibration scheme to calibrate the gyro filters 155a, 155b. For example, a vibrator signal may be applied to the sensor 105, an output signal of each gyro filter 155a, 155b may be measured, and then a sensitivity correction gain value may be computed for each gyro filter 155a, 155b according to the vibrator signals and the measured output signals. Each computed sensitivity correction gain may then be applied to one of the respective output signals. After the system finishes (395) performing the gyro filter calibration scheme 390, the system 100 may generate the drive signal $S_{DR}$ according to the velocity signal $S_{VEL}$, the acceleration signal $S_{ACC}$ and the correction gains $A_{1\_X}$-$A_{4\_X}$, $A_{1\_Y}$ and $A_{4\_Y}$.

As an example, during normal operation, sub-circuits 160a, 160b, 165a, 165b, 170a, 175b may simultaneously perform various functions on the velocity signal $S_{VEL}$ and the acceleration signal $S_{ACC}$, such as offset adjustment, phase adjustment, filtering, signal conversion, inertial force cancellation, and more. Each sub-circuit 160a, 160b, 165a, 165b, 170a, 170b may generate its respective output signal $S_{OUT1\_X}$, $S_{OUT1\_Y}$, $S_{OUT2\_X}$, $S_{OUT2\_Y}$, $S_{OUT3\_X}$, $S_{OUT3\_Y}$.

The first x- and y-axis output signals $S_{OUT1\_X}$, $S_{OUT1\_Y}$ may be transmitted to the first amplifier 200a and the fifth amplifier 200b, respectively. The second x- and y-axis output signals $S_{OUT2\_X}$, $S_{OUT2\_Y}$ may be transmitted to the second amplifier 205a and the sixth amplifier 205b, respectively. The third x- and y-axis output signals $S_{OUT3\_X}$, $S_{OUT3\_Y}$ may be transmitted to the third amplifier 210a and the seventh amplifier 210b, respectively.

The first amplifier 200a may generate the first corrected x-axis output signal $S_{OUT1\_CORR\_X}$ by applying the second x-axis correction gain $A_{2\_X}$ to the first x-axis output signal $S_{OUT1\_X}$. The second amplifier 205a may generate the second corrected x-axis output signal $S_{OUT2\_CORR\_X}$ by applying the third x-axis correction gain $A_{3\_X}$ to the second x-axis output signal $S_{OUT2\_X}$. The third amplifier 210a may generate the third corrected x-axis output signal $S_{OUT3\_CORR\_X}$ by applying the fourth x-axis correction gain $A_{4\_X}$ to the third x-axis output signal $S_{OUT3\_X}$.

Similarly, the fifth amplifier 200b may generate the first corrected y-axis output signal $S_{OUT1\_CORR\_Y}$ by applying the second y-axis correction gain $A_{2\_Y}$ to the first y-axis output signal $S_{OUT1\_Y}$. The sixth amplifier 205b may generate the second corrected y-axis output signal $S_{OUT2\_CORR\_Y}$ by applying the third y-axis correction gain $A_{3\_Y}$ to the second y-axis output signal $S_{OUT2\_Y}$. Similarly, the seventh amplifier 210b may generate the third corrected y-axis output signal $S_{OUT3\_CORR\_Y}$ by applying the fourth y-axis correction gain $A_{4\_Y}$ to the third y-axis output signal $S_{OUT3\_Y}$.

The corrected x-axis signals $S_{OUT1\_CORR\_X}$, $S_{OUT2\_CORR\_X}$, $S_{OUT3\_CORR\_X}$ may then be transmitted to the first addition circuit 178a where they may be added to each other and to the x-component of the acceleration signal $S_{ACC}$ before being transmitted, in the form of the first summed signal $S_{SUM\_X}$, to the first inertial force cancellation circuit 175a for further processing. Similarly, the corrected y-axis signals $S_{OUT1\_CORR\_Y}$, $S_{OUT2\_CORR\_Y}$, $S_{OUT3\_CORR\_Y}$ may be transmitted to the third addition circuit 178b where they may be added to each other and to the y-component of the acceleration signal $S_{ACC}$ before being transmitted, in the form of the second summed signal $S_{SUM\_Y}$, to the second inertial force cancellation circuit 175b for further processing.

After the first inertial force cancellation circuit 175a receives the first summed signal $S_{SUM\_X}$ from the first addition circuit 178a, it may generate the fourth x-axis output signal $S_{OUT4\_X}$ according to the first summed signal $S_{SUM\_X}$. The first inertial force cancellation circuit 175a may then transmit the fourth x-axis output signal $S_{OUT4\_X}$ to the fourth amplifier 215a. In response to receiving the fourth x-axis output signal $S_{OUT4\_X}$ from the first inertial force cancellation circuit 175a, the fourth amplifier 215a may generate the fourth corrected x-axis output signal $S_{OUT4\_CORR\_X}$ by applying the first x-axis correction gain $A_{1\_X}$ to the fourth x-axis output signal $S_{OUT4\_X}$.

Similarly, after the second inertial force cancellation circuit 175b receives the second summed signal $S_{SUM\_Y}$ from the third addition circuit 178b, it may generate the fourth y-axis output signal $S_{OUT4\_Y}$ according to the second summed signal $S_{SUM\_Y}$. The second inertial force cancellation circuit 175b may then transmit the fourth y-axis output signal $S_{OUT4\_Y}$ to the eighth amplifier 215b. In response to receiving the fourth y-axis output signal $S_{OUT4\_Y}$ from the second inertial force cancellation circuit 175b, the eighth amplifier 215b may generate the fourth corrected y-axis output signal $S_{OUT4\_CORR\_Y}$ by applying the first y-axis correction gain $A_{1\_Y}$ to the fourth y-axis output signal $S_{OUT4\_Y}$.

In addition, the gyro filters 155a, 155b and the acceleration filters 156a, 156b may simultaneously perform various functions on the velocity signal $S_{VEL}$ and the acceleration signal $S_{ACC}$, respectively, such as integration and frequency characteristic adjustment. For example, the gyro filters 155a, 155b and the acceleration filters 156a, 156b may operate in conjunction with each other to calculate the target position of the lens 142.

The gyro filters 155a, 155b may utilize the x- and y-components of the velocity signal $S_{VEL}$ to generate the first and second gyro filter output signals $S_{GF\_OUT\_X}$, $S_{GF\_OUT\_Y}$. The gyro filters 155a,155b may convert various angular velocity components of the velocity signal $S_{VEL}$ to respective shake angles. Each angular velocity component may be associated with one of the x-, y-components of the velocity signal $S_{VEL}$, and each shake angle may be associated with one angular velocity component. The gyro filters 155a, 155b and the acceleration filters 156a, 156b may then determine a target position of the lens 142 in each direction according to the respective shake angle.

For example, in the case of the y-axis, the first gyro filter 155a may compute an integration of the angular velocity around the x-axis to generate its respective shake angle. The first gyro filter 155a may then determine the target position of the lens 142 in the x-axis direction according to the calculated shake angle. The first gyro filter 155a may then transmit the target position, in the form of the first gyro filter output signal $S_{GF\_OUT\_X}$, to another portion of the actuator control circuit 120, such as the first linearity correction circuit 157a for additional processing. The first gyro filter output signal $S_{GF\_OUT\_X}$ may be a current signal.

The acceleration filters 156a, 156b may utilize one of the x- and y-components of the acceleration signal $S_{ACC}$ to generate the first and second acceleration filter output signals $S_{AF\_OUT\_X}$, $S_{AF\_OUT\_Y}$. For example, the acceleration filters 156a, 156b may perform a double-integration of the x- and y-components of the acceleration signal $S_{ACC}$ to generate a position signal of the lens 142. The acceleration filters 156a, 156b may then use the position signal to compute a deviation from the target reference position. The acceleration filters 156a, 156b may then transmit each computed deviation, in the form of the first and second acceleration filter output signals $S_{AF\_OUT\_X}$, $S_{AF\_OUT\_Y}$ to another portion and/or sub-circuit of the actuator control circuit 120 for further processing, such as the first and second gyro filters 155a, 155b, respectively. Each acceleration filter output signal $S_{AF\_OUT\_X}$, $S_{AF\_OUT\_Y}$ may be a current signal.

The gyro/acceleration filters 155a, 155b, 156a, 156b may then transmit the first and second gyro filter output signals $S_{GF\_OUT\_X}$, $S_{GF\_OUT\_Y}$ and the first and second acceleration filter output signals $S_{AF\_OUT\_X}$, $S_{AF\_OUT\_Y}$ to the first and second linearity correction circuits 157a, 157b. It will be appreciated that the gyro filter output signals $S_{GF\_OUT\_X}$, $S_{GF\_OUT\_Y}$ and the acceleration filter output signal $S_{AF\_OUT\_X}$, $S_{AF\_OUT\_Y}$ may be added together before being transmitted to the first and second linearity correction circuits 157a, 157b.

The first linearity correction circuit 157a may apply a gain to the first gyro filter output signal $S_{GF\_OUT\_X}$ received from the first gyro filter 155a before transmitting the amplified signal, in the form of the first linearity correction output signal $S_{OUT\_LC\_X}$ to the second addition circuit 179a, where it may be added to the fourth corrected x-axis output signal $S_{OUT4\_CORR\_X}$ to generate the first drive signal $S_{DR\_X}$. Similarly, the second linearity correction circuit 157b may apply a gain to the second gyro filter output signal $S_{GF\_OUT\_Y}$ received from the second gyro filter 155b before transmitting the amplified signal, in the form of the second linearity correction output signal $S_{OUT\_LC\_Y}$ to the fourth addition circuit 179b, where it may be added to the fourth corrected y-axis output signal $S_{OUT4\_CORR\_Y}$ to generate the second drive signal $S_{DR\_Y}$.

The first and second drive signals $S_{DR\_X}$, $S_{DR\_Y}$ may then be transmitted to the actuator 115 via the first and second driver circuits 180a, 180, respectively. Once the actuator 115 receives each drive signal $S_{DR\_X}$, $S_{DR\_Y}$, it may convert each drive signals $S_{DR\_X}$, $S_{DR\_Y}$ to a respective one of the corresponding drive forces $F_{DR\_X}$, $F_{DR\_Y}$. The drive forces $F_{DR\_X}$, $F_{DR\_Y}$ may then be applied to the lens 142.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. A system for positioning a lens, the system comprising:
an actuator control unit, wherein the actuator control unit includes:
a plurality of registers, wherein registers of a first subset of the plurality of registers are configured to store velocity values, and wherein registers of a second subset of the plurality of registers are configured to store acceleration values;
a first plurality of correction circuits configured to produce, using one or more of the velocity values, a first plurality of force correction signals and a second plurality of force correction signals;
a second plurality of correction circuits configured to produce, using one or more of the acceleration values, a first corrected acceleration value along a first axis and a second corrected acceleration value along a second axis perpendicular to the first axis;
a first adder configured to produce a first sum signal using the first plurality of force correction signals and the first corrected acceleration value;
a second adder configured to produce a second sum signal using the second plurality of force correction signals and the second corrected acceleration value; and
one or more drivers configured to cause an adjustment to a position of the lens based on the first sum signal and the second sum signal.

2. The system of claim 1, wherein the first plurality of correction circuits are further configured to produce, using one or more of the velocity values, one or more corrected velocity values including:
a first corrected velocity value along the first axis;
a second corrected velocity value along the second axis; and
a third corrected velocity value along a third axis perpendicular to the first axis and the second axis.

3. The system of claim 1, wherein the actuator control unit further comprises:
a first force cancellation unit configured to produce a first force cancellation signal using the first sum signal; and
a second force cancellation unit configured to produce a second force cancellation signal using the second sum signal.

4. The system of claim 3, wherein the first plurality of correction circuits are further configured to produce, using one or more of the velocity values, one or more corrected velocity values, wherein the actuator control unit further comprises:
a first filter configured to produce a first filtered signal using a first one of the corrected velocity values;
a first linearity circuit configured to produce a first linearity correction signal by applying a first gain to the first filtered signal; and
a third adder configured to generate a first drive signal based on a sum of the first linearity correction signal and an amplified version of the first sum signal, wherein the one or more drivers are configured to cause the adjustment to the position of the lens along the first axis based on the first drive signal.

5. The system of claim 4, wherein the actuator control unit further comprises:
a second filter configured to produce a second filtered signal using a second one of the corrected velocity values;
a second linearity circuit configured to produce a second linearity correction signal by applying a second gain to the second filtered signal; and
a fourth adder configured to generate a second drive signal based on a sum of the second linearity correction signal and an amplified version of the second sum signal, wherein the one or more drivers are configured to cause the adjustment to the position of the lens along the second axis based on the second drive signal.

6. The system of claim 1, further comprising an actuator coupled to the actuator control unit, wherein the actuator control unit is configured to induce a voltage in the actuator to cause the adjustment to the position of the lens in response to one or more drive signals conveyed by the one or more drivers.

7. The system of claim 1, further comprising:
a gyro sensor configured to generate the velocity values; and
an acceleration sensor configured to generate the acceleration values.

8. The system of claim 1, further comprising a processor coupled to the actuator control unit, wherein the processor is configured to perform a calibration of a first drive signal generated by a first driver of the one or more drivers and a second drive signal generated by a second driver of the one or more drivers.

9. A method comprising:
storing, using a first subset of a plurality of registers of an actuator control unit, velocity values received from a gyro sensor;
storing, using a second subset of the plurality of registers of the actuator control unit, acceleration values an acceleration sensor;
producing, based on at least one of the velocity values and one or more first correction circuits, a first plurality of force correction signals and a second plurality of force correction signals;
producing, based on at least one of the acceleration values and one or more second correction circuits, a first corrected acceleration value along a first axis and a second corrected acceleration value along a second axis perpendicular to the first axis;
producing, using a first adder, a first sum signal by adding the first plurality of force correction signals and the first corrected acceleration value;
producing, using a second adder, a second sum signal by adding the second plurality of force correction signals and the second corrected acceleration value; and
adjusting, using one or more drivers, a position of a lens based on the first sum signal and the second sum signal.

10. The method of claim 9, further comprising:
producing a first corrected velocity value along the first axis;
producing a second corrected velocity value along the second axis; and
producing a third corrected velocity value along a third axis perpendicular to the first axis and the second axis.

11. The method of claim 9, further comprising:
producing, using a first force cancellation unit and the first sum signal, a first force cancellation signal; and
producing, using a second force cancellation unit and the second sum signal, a second force cancellation signal.

12. The method of claim 11, further comprising:
producing, using the one or more first correction circuits, one or more corrected velocity values based on one or more of the velocity values;
filtering, using a first filter circuit, a first one of the one or more corrected velocity values to generate a first filtered signal;
producing a first linearity correction signal by applying a first gain to the first filtered signal;
producing, using a third adder, a first drive signal based on a sum of the first linearity correction signal and an amplified version of the first sum signal; and
adjusting the position of the lens along the first axis based on the first drive signal.

13. The method of claim 12, further comprising
filtering, using a second filter circuit, a second one of the one or more corrected velocity values to generate a second filtered signal;
producing a second linearity correction signal by applying a second gain to the second filtered signal;
producing, using a fourth adder, a second drive signal based on a sum of the second linearity correction signal and an amplified version of the second sum signal; and
adjusting the position of the lens along the second axis based on the second drive signal.

14. The method of claim 9, further comprising performing, using a processor and a plurality of input signals provided to the actuator control unit, a plurality of calibrations to cause the actuator control unit to compensate for respective sensitivities of the gyro sensor and the acceleration sensor.

15. A system comprising:
a gyro sensor configured to generate a plurality of velocity values;
an acceleration sensor configured to generate a plurality of acceleration values;
an actuator configured to adjust a position of a lens; and
an actuator control unit configured to generate, using a first sum signal and a second sum signal, drive signals to cause the actuator to adjust of the position of the lens, wherein the actuator control unit is coupled to the gyro sensor and the acceleration sensor, and wherein the actuator control unit includes:
a plurality of correction circuits configured to:
produce, using one or more of the velocity values, a first plurality of force correction signals and a second plurality of force correction signals, and
produce, using one or more of the acceleration values, a first corrected acceleration value along a first axis and a second corrected acceleration value along a second axis perpendicular to the first axis;
a plurality of adders configured to:
produce the first sum signal using the first plurality of force correction signals and the first corrected acceleration value, and
produce the second sum signal using the second plurality of force correction signals and the second corrected acceleration value; and
one or more drivers configured to, using the drive signals, cause the actuator to cause the adjustment of the position of the lens.

16. The system of claim 15, further comprising a processor coupled to the actuator control unit, wherein the processor is configured to, using a plurality of input signals provided to the actuator control unit, perform a plurality of calibration of the drive signals.

* * * * *